(12) United States Patent
Winkler et al.

(10) Patent No.: US 8,457,996 B2
(45) Date of Patent: Jun. 4, 2013

(54) MODEL-BASED BUSINESS CONTINUITY MANAGEMENT

(75) Inventors: Ulrich Winkler, Belfast (GB); Wasif Gilani, Shore Road (GB); David Redlich, Belfast (GB)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/118,340

(22) Filed: May 27, 2011

(65) Prior Publication Data

US 2012/0303396 A1    Nov. 29, 2012

(51) Int. Cl.
*G06Q 40/00* (2012.01)
(52) U.S. Cl.
USPC .............................. 705/7; 705/7.11
(58) Field of Classification Search
USPC ................................. 705/7.11–7.42
See application file for complete search history.

(56) References Cited

U.S. PATENT DOCUMENTS

| | | | |
|---|---|---|---|
| 5,394,347 A | 2/1995 | Kita et al. | |
| 6,314,434 B1* | 11/2001 | Shigemi et al. | 707/695 |
| 8,117,597 B2* | 2/2012 | Shia | 717/123 |
| 2006/0053039 A1* | 3/2006 | Gamarnik et al. | 705/7 |
| 2007/0094211 A1 | 4/2007 | Sun et al. | |
| 2007/0150322 A1 | 6/2007 | Falchuk et al. | |
| 2007/0208590 A1 | 9/2007 | Dorricott et al. | |
| 2008/0229275 A1 | 9/2008 | Weber | |
| 2009/0113394 A1* | 4/2009 | Weber et al. | 717/126 |
| 2009/0235252 A1* | 9/2009 | Weber et al. | 718/100 |
| 2010/0036704 A1* | 2/2010 | Romano, Jr. | 705/8 |
| 2010/0114586 A1 | 5/2010 | Barros et al. | |
| 2010/0174583 A1* | 7/2010 | Passova et al. | 705/10 |
| 2011/0078650 A1 | 3/2011 | Weber | |

OTHER PUBLICATIONS

Tjoa, et al, "Extension of a Methodology for Risk-Aware Business Process Modeling and Simulation Enabling Process-Oriented Incident Handling Support", 22nd International Conference on Advanced Information Networking and Applications, Mar. 2008, pp. 48-55.
Asnar, et al, "Analyzing Business Continuity through a Multi-Layers Model", Proceedings of the 6th International Conference on Business Process Management, 2008, 5 pages.
Asnar, "Requirements Analysis and Risk Assessment for Critical Information Systems", Universita Degli Studi di Trento, International Doctorate School in Information and Communication Technologies, XX Cyle, 2009, 169 pages.
Bernardi, et al, "A dependability profile within MARTE", Software & Systems Modeling, 2009, 37 pages.
Wijnia, et al, "Assessing business continuity risks in IT", 2007 IEEE International Conference on Systems, Man and Cybernetics, pp. 3547-3553.

(Continued)

*Primary Examiner* — Thomas Dixon
*Assistant Examiner* — Benjamin S Fields
(74) *Attorney, Agent, or Firm* — Brake Hughes Bellermann LLP

(57) ABSTRACT

A business process model (BPM) handler may determine a business process model including tasks arranged according to a directed graph, at least some of the tasks associated with requirements for executing the tasks. An information technology topology model (ITTM) handler may determine an information technology topology model with connected resources used to perform at least some of the tasks. A behavior model generator may determine behaviors of the resources from a behavior information library, and may generate a behavior model in which the tasks and their respective requirements are connected to the resources and to their respective behaviors. A continuity analyzer may thus provide a continuity analysis, based on the behavior model.

20 Claims, 28 Drawing Sheets

OTHER PUBLICATIONS

"Fault tree analysis (FTA)", Australian Standard, Geneva: International Electrotechnical Commission, AS IEC 61025, Ed 2.0, 2008, 8 pages.

Miller, "Salesforce.com Hit by One Hour Outage", Data Center Knowledge, Jan. 4, 2010, 1 page.

Object Management Group, "Business Process Modeling Notation Specification", Final Adopted Specification, Version 1.0, Feb. 2006, 308 pages.

Tjoa, et al, "Enhancing Business Impact Analysis and Risk Assessment Applying a Risk-Aware Business Process Modeling and Simulation Methodology", 2008 Third International Conference on Availability, Reliability and Security, Mar. 2008, pp. 179-186.

Vanderaalst, et al, "YAWL: yet another workflow language", Information Systems, vol. 30, No. 4, 2005, pp. 245-275.

Office Action for U.S. Appl. No. 11/932,730, mailed Dec. 8, 2011, 6 pages.

Non-Final Office Action for U.S. Appl. No. 11/932,730, mailed Mar. 29, 2012, 20 pages.

Restriction Response for U.S. Appl. No. 11/932,730, filed Jan. 9, 2012, 1 page.

Mendling, "Detection and Prediction of Errors in EPC Business Process Models", Dissertation, Institute of Information Systems and New Media, Vienna University of Economics and Business Administration, May 22, 2007, 362 pages.

Non-Final Office Action for U.S. Appl. No. 12/263,450, mailed Oct. 9, 2012, 25 pages.

"Security Review: Force.com AppExchange Security Review", retrieved on Mar. 19, 2010 from http://wiki.developerforce.com/index.php/Security_Review, 2 pages.

"StrikeIron, Inc.", retrieved on Mar. 19, 2010 from http://www.webservices.org/vendors/strikeiron_inc, 1 page.

"StrikeIron", retrieved on Mar. 19, 2010 from http://www.strikeiron.com/Home.aspx, 3 pages.

Extended European Search Report for EP Patent Application No. 09013749.8, mailed on Feb. 8, 2010, 7 pages.

Non Final Office Action for U.S. Appl. No. 11/932,730, mailed Mar. 29, 2012, 20 pages.

Final Office Action for U.S. Appl. No. 11/932,730, mailed Sep. 20, 2012, 12 pages.

Final Office Action for U.S. Appl. No. 12/263,450, mailed Jan. 9, 2012, 18 pages.

Non-Final Office Action Response for U.S. Appl. No. 12/263,450, filed Nov. 1, 2011, 12 pages.

Office Action Response for U.S. Appl. No. 12/263,450, filed May 8, 2012, 15 pages.

Non Final Office Action for U.S. Appl. No. 12/263,450, mailed on Jun. 27, 2011, 22 pages.

Ankolekar, et al, "Towards a Formal Verification of OWL-S Process Models", Fourth International Semantic Web Conference, 2005, 15 pages.

Awad, et al, "Efficient Compliance Checking Using BPMN-Q and Temporal Logic", Proceedings of the 6th International Conference on Business Process Management, LNCS, vol. 5240, 2008, pp. 326-341.

Bonatti, et al, "Rule-based Policy Specification: State of the Art and Future Work", Sep. 2004, 172 pages.

Brat, et al, "Combining Static Analysis and Model Checking for Software Analysis", 16th IEEE International Conference on Automated Software Engineering (ASE'01), 2001, pp. 262-271.

Drumm, et al, "SUPER Deliverable D3.2: Dynamic Composition Reasoning Framework and Prototype", Project IST 026850, Semantics Utilized for Process management within and between Enterprises, Sep. 2007, 222 pages.

Office Action for EP Application No. 09013749.8, mailed Feb. 15, 2011, 5 pages.

European Search Report for EP Application No. 12003946.6, mailed Oct. 8, 2012, 6 pages.

Fisteus, et al, "Applying Model Checking to BPEL4WS Business Collaborations", 2005 ACM Symposium on Applied Computing, Mar. 2005, pp. 826-830.

Fu, et al, "Analysis of Interacting BPEL Web Services", Proceedings of the 13th International Conference on World Wide Web, May 2004, pp. 621-630.

Fuxman, "Formal Analysis of Early Requirements Specifications", 2001, 113 pages.

Godefroid, "Partial-Order Methods for the Verification of Concurrent Systems: An Approach to the State-Explosion Problem", 1996, 133 pages.

Janssen, et al, "Verifying Business Processes using SPIN", Proceedings of the 4th International SPIN Workshop, 1998, 16 pages.

Kazhamiakin, et al, "Formal Verification of Requirements using SPIN: A Case Study on Web Services", Proceedings of the Second International Conference on Software Engineering and Formal Methods, 2004, 10 pages.

Kovalyov, et al, "A polynomial algorithm to compute the concurrency relation of free-choice Signal Transition Graphs", In Proceedings of the International Workshop on Discrete Event Systems, 1995, 13 pages.

Liu, "A Static Compliance Checking Framework for Business Process Models", Research Report, Nov. 2006, 34 pages.

Ly, et al, "Semantic Correctness in Adaptive Process Management Systems", LNCS, vol. 4102, 2006, 16 pages.

McMillan, "Symbolic Model Checking: An Approach to the State Explosion Problem", CMU-CS-92-131, May 1992, 212 pages.

Nakajima, "Verification of Web Service Flows with Model-Checking Techniques", Proceedings of the First International Symposium on Cyber Worlds, 2002, 8 pages.

Narayanan, et al, "Simulation, Verification and Automated Composition of Web Services", WWW, May 2002, 12 pages.

Radwan, et al, "Designing an Integrated Enterprise Model to support Partnerships in the Geo-Information Industry", retrieved on Mar. 9, 2010 from http://www.gisdevelopment.net/technology/gis/ma03111pf.htm, 11 pages.

Ribeiro, "Translating Synchronous Petri Nets into PROMELA for Verifying Behavioural Properties", International Symposium on Industrial Embedded Systems, 2007, 8 pages.

Ricciuti, "Salesforce buy extends reach to mobile devices", CNET News, Apr. 11, 2006, 1 page.

Roman, et al, "WSMO Choreography: From Abstract State Machines to Concurrent Transaction Logic", LNCS, vol. 5021, 2008, 16 pages.

van der Aalst, "Verification of Workflow Nets", Proceedings of the 18th International Conference on Application and Theory of Petri Nets, LNCS, vol. 1248, 1997, 21 pages.

van der Aalst, "Workflow Patterns", Distributed and Parallel Databases, Jul. 2003, 70 pages.

Vanhatalo, et al, "The Refined Process Structure Tree", The 6th International Conference on Business Process Management, Sep. 2008, 24 pages.

Verbeek, et al, "Diagnosing Workflow Processes using Woflan", The Computer Journal, 34 pages.

Vaz, et al, "Towards Automated Verification of Web Services", International Association for Development of the Information Society (IADIS) International Conference, Oct. 2007, 9 pages.

Vanhatalo, et al, "Faster and More Focused Control-Flow Analysis for Business Process Models through SESE Decomposition", Research Report, Jul. 2007, 17 pages.

Wainewright, "How is AppExchange really doing?", Software as Services, May 10, 2007, 3 pages.

Zhao, et al, "Towards the Formal Model and Verification of Web Service Choreography Description Language", Third International Workshop on Web Services and Formal Methods, 2006, 16 pages.

Weber, et al, "Semantic Business Process Validation", 3rd International Workshop on Semantic Business Process Management, 2008, 36 pages.

Winslett, "Reasoning About Action Using A Possible Models Approach", AAAI-88 Proceedings, 1988, 5 pages.

* cited by examiner

MODEL-BASED BUSINESS CONTINUITY MANAGEMENT

TECHNICAL FIELD

This description relates to business continuity management.

BACKGROUND

Many businesses are highly motivated to minimize or eliminate interruptions of services provided by the businesses to or for their customers. Otherwise, such interruptions may have significant negative consequences for such businesses, such as, for example, loss of customers, the threat of litigation, loss of reputation, and, ultimately, reductions in profit and a potential inability to continue operations of the business.

For example, any business which provides information technology (IT) resources, or which relies on IT resources, may wish to minimize or eliminate interruptions to business operations which may result from malfunctions of hardware and/or software associated with the IT resources. For example, businesses which sell goods or services over the Internet may rely on a plurality of servers used to respond to customer requests and to otherwise conduct transactions with customers over the Internet. If such servers malfunction (e.g., for example, during periods of high volume of demand, or due to power outages, overheating, or other physical constraints), such businesses may be limited in their ability to respond to customer requests and to conduct transactions with customers. Similarly, businesses which rely on IT resources or other physical resources to support front-end interactions with customers may experience negative consequences in their customer interactions as a result of back-end malfunctions or other difficulties in the availability of relevant resources.

Therefore, various types of analyses have been undertaken as part of efforts to quantify, and otherwise describe, an extent to which a business will be able to minimize or eliminate such interruptions to its operations. For example, such analysis techniques are used to attempt to quantify and describe threats to a continuity of business operations of a business, as well as associated probabilities that such threats may occur, an impact of such threats that do occur, and a type and extent of recovery actions that may be taken in response to the occurrence of continuity disruptions.

Unfortunately, such analysis techniques are often implemented on an essentially ad-hoc basis, with little or no formalized, repeatable approaches that can be widely or consistently applied across operations of one or more businesses. For example, human analysts who implement such techniques may proceed by manually creating graphical or written descriptions of relevant business operations and associated resources, and may thereafter attempt to quantify and describe the various factors referenced above which may be relevant to assessing a future continuity of the analyzed business operations. However, it may be difficult for such human analysts to consider and quantify the various relationships and dependencies between and among the various business operations and their underlying resources. As a result, the results of such analyses may be limited in their utility.

Moreover, even to the extent that such results are useful, it may occur that changes to the business operations and/or associated resources may require associated changes in the related continuity analysis. In such scenarios, even for relatively minimal or infrequent changes to the operations/resources, significant cost, time, and/or effort associated with the human analyst may be required in order to determine an impact of the changes on the associated continuity analysis. Consequently, it is often difficult for business providers and other interested parties to assess risks associated with potential disruptions of business operations, or to plan accordingly to account for such disruptions.

SUMMARY

According to one general aspect, a system may include instructions recorded on a computer-readable medium and executable by at least one processor. The system may include a business process model (BPM) handler configured to cause the at least one processor to determine a business process model including tasks arranged according to a directed graph, at least some of the tasks associated with requirements for executing the tasks. The system also may include an information technology topology model (ITTM) handler configured to cause the at least one processor to determine an information technology topology model with connected resources used to perform at least some of the tasks. The system also may include a behavior model generator configured to cause the at least one processor to determine behaviors of the resources from a behavior information library, and to generate a behavior model in which the tasks and their respective requirements are connected to the resources and to their respective behaviors. The system also may include a continuity analyzer configured to cause the at least one processor to provide a continuity analysis, based on the behavior model.

According to another general aspect, a computer program product may be tangibly embodied on a computer-readable storage medium and may include instructions that, when executed, are configured to determine a business process model including tasks arranged according to a directed graph, at least some of the tasks associated with requirements for executing the tasks, and determine an information technology topology model with connected resources used to perform at least some of the tasks. The instructions, when executed, may be configured to determine behaviors of the resources from a behavior information library, generate a behavior model in which the tasks and their respective requirements are connected to the resources and to their respective behaviors, and provide a continuity analysis, based on the behavior model.

According to another general aspect, a computer-implemented method may include executing, using at least one processor, instructions recorded on a non-transitory computer-readable storage medium. The method may include determining a business process model including tasks arranged according to a directed graph, at least some of the tasks associated with requirements for executing the tasks, determining an information technology topology model with connected resources used to perform at least some of the tasks, and determining behaviors of the resources from a behavior information library. The method may include generating a behavior model in which the tasks and their respective requirements are connected to the resources and to their respective behaviors, and providing a continuity analysis, based on the behavior model.

The details of one or more implementations are set forth in the accompanying drawings and the description below. Other features will be apparent from the description and drawings, and from the claims.

DETAILED DESCRIPTION

Figure 1:
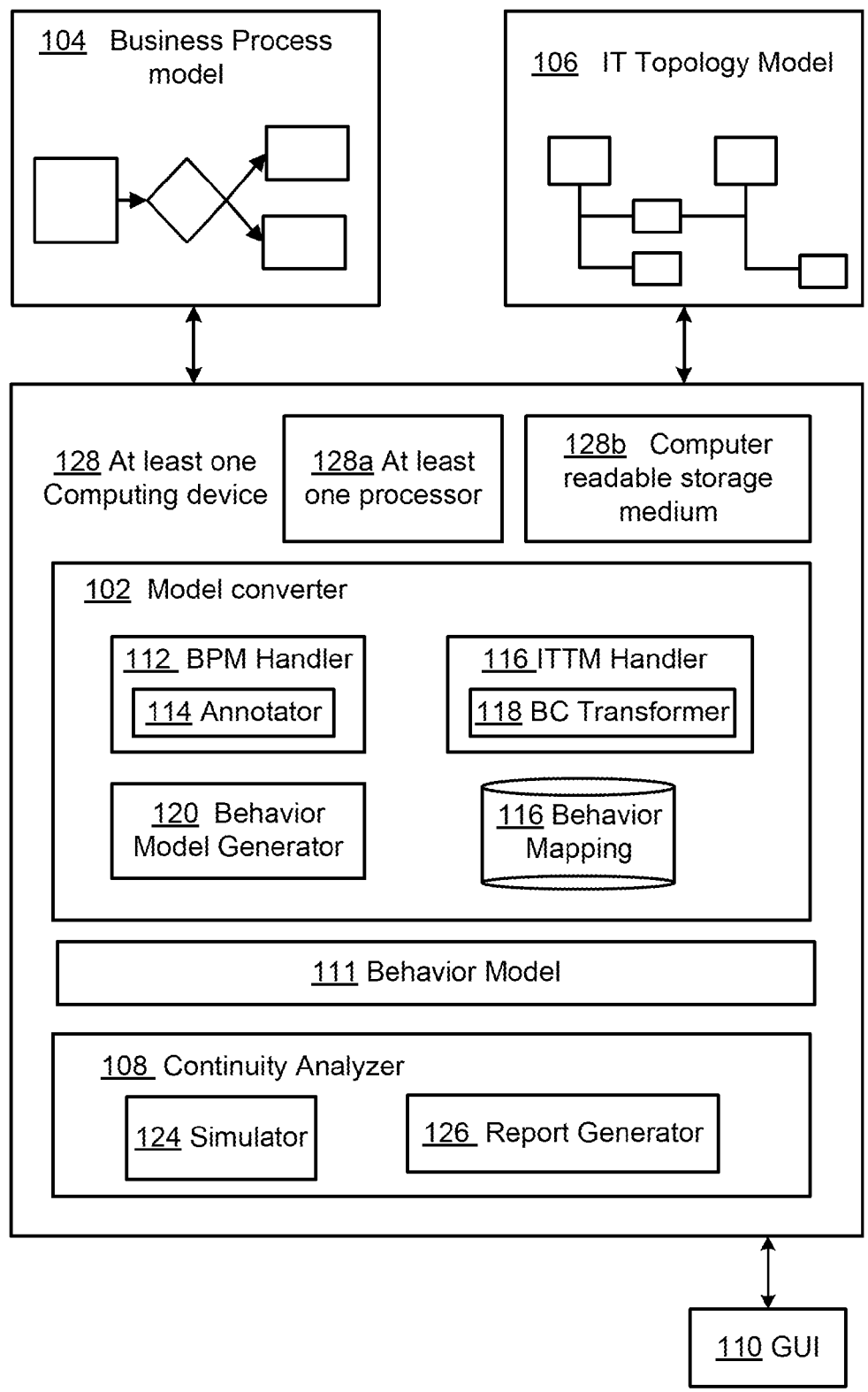
FIG. 1 is a block diagram of a system for providing model-based business continuity analysis support.

FIG. 1 is a block diagram of a system 100 for providing model-based business continuity analysis. In the example of FIG. 1, a model converter 102 is illustrated which may be configured to receive a business process model (BPM) 104 in conjunction with an information technology topology model (ITTM) 106, and further configured to transform or otherwise modify or convert the models 104, 106 into a format which is compatible with input requirements of a continuity analyzer 108.

The models 104, 106 may be associated with a corresponding business, or operations or aspects of such a business. As a result, the continuity analyzer 108 may be enabled to perform a continuity analysis of the corresponding business. In this way, as described in detail herein, a user of the system 100 (e.g., an owner or other stakeholder of the business) may be provided with information related to the ongoing continuity of the business in question, e.g., may be provided with actionable information related to potential threats, risks, impacts, and required or desired recovery operations which may be potentially associated with discontinuities that might be experienced with respect to operations of the business. Moreover, such continuity analyses may be provided in a fast, automatic, reliable, and repeatable manner, so that the user of the system 100 of FIG. 1 may quickly be provided with sufficient information to make an optimal decision regarding future operations of the business.

In FIG. 1, the business process model 104 may be understood to represent any current or future type of business process model where, as is well known, a number of conventional examples of such business process models currently exist. For example, such conventional process models generally include directed, acyclic graphs in which individual nodes represent specific tasks to be performed as part of the business process, and/or control nodes and associated control flows for traversing directed edges of the graph, and which define an order of operation of the task nodes of the graph. Thus, such task nodes of the business process model 104 may be connected and ordered using directed edges which arrange the task nodes in any conventional manner, e.g., in a sequential or parallel manner, or in any sort of iterative, nested, looped, or other order, or combinations thereof. Various examples of such business process models would be apparent to one of skill in the art, and/or are provided in detail herein (e.g., with respect to the implementation example described with respect to FIG. 17).

In many cases, the business process model 104 may be written in one or more of a number of known programming languages which are designed to represent the business process model in an executable manner. For example, the business process model notation (BPMN) language is known to be available for representing business process models in a manner which allows automatic execution thereof within a corresponding execution engine. For example, such execution engines may be known by one or more terminologies, e.g., a workflow engine or an orchestration engine, but generally, as referenced above, serve the purpose of automatically executing the business process model 104. That is, for example, such an orchestration engine (not specifically illustrated in the example of FIG. 1) may be responsible for monitoring a current status or state of a given task of the business process model 104, ensuring that an appropriate order of the relevant control flow is followed, ensuring that a given task completes fully before enabling commencement of a sequentially subsequent task, and otherwise for maintaining a desired/designed operation of the business process model 104.

In many cases, the various tasks of the business process model 104 may be completed by human actors, hardware devices, software applications, or various combinations thereof. For example, in a simple example, the business process model 104 may include a number of tasks, where each task is associated with (e.g., assigned to) a corresponding human user. Thus, actual performance of the various tasks may be performed by the appropriate human user. Nonetheless, in such examples, the business process model 104 may be designed and executed within the context of a corresponding orchestration engine which provides the functionality referenced above.

In other example implementations, each task of the business process model 104 may be associated with, or assigned to, a corresponding hardware and/or software component which may be enabled to automatically begin, execute, and complete the corresponding task. In such examples, the business process model 104 may be executed in a completely autonomous or automatic fashion. Of course, various combinations of the above described examples also are possible, as well as many other example implementations which are not necessarily described here in detail, but which would be apparent to one of skill in the art.

Further in the example of FIG. 1, the IT topology model 106 may generally represent, for example, virtually any graphical representation of information technology resources associated with, or available to, the business, and that may be potentially related to operations of the business process model 104. For example, the IT topology model 106 may represent relevant hardware, software, device, or other type of IT resource, or combinations thereof. The IT topology model 106 also may include representations of IT professionals (e.g., network administrators) who are responsible for maintenance and operation of the various computing resources associated with the IT topology model 106. The IT topology model 106 also may represent the various connections between the various resources represented therein. For example, the IT topology model 106 may represent the existence of a wired or wireless network connecting two or more of the various computing resources. Thus, the IT topology model may represent various subsets or other groupings of computing resources as being connected or otherwise related to one another. Further, various other information may be associated with, or represented by, the IT topology model 106. For example, such information may include device characteristics of the individual computing resources (e.g., may represent an available processing or memory capacity thereof). Further conventional aspects of the IT topology model 106 are described herein (e.g., with respect to FIG. 19, below), or would be apparent to one of skill in the art.

In general, the models 104, 106 are well known as being designed and implemented for their respective intended purposes, and are optimized as such. However, the conventional models 104, 106, while being familiar and widely available to respective business and IT professionals, are not conventionally designed for, or used in conjunction with, business continuity analysis. Nonetheless, as described in detail herein, the model converter 102 may be configured to input, modify, transform, and otherwise convert the models 104, 106 (and combinations thereof) into a format and structure which are compatible for input to the continuity analyzer 108, so that corresponding business continuity analyses may be performed in a selectable, automatic, and straightforward manner. Further, as described, the resulting business continuity analysis may be specifically tailored to the needs of various users, and may be easily updated in all such contexts in response to any underlying changes in the related business and/or IT infrastructure(s).

In the example of FIG. 1, a graphical user interface (GUI) is illustrated which may be understood to represent one or more such GUIs which may be instrumental in various stages or aspects of example implementations of the system 100. For example, as described below with respect to FIG. 3, and illustrated in the example screenshots of FIGS. 17-28, the GUI 110 may represent various such graphical user interfaces which are used, for example, to design and implement one or both of the models 104, 106, as well as transformations thereof which are input into the continuity analyzer 108. In additional examples, the GUI 110 may be used to interact with the model converter 102 (e.g., to facilitate the various conversion processes associated with transforming the models 104, 106 into an input which is compatible with the continuity analyzer 108.

Specifically, in the example of FIG. 1, the model converter 102 may be configured to input the models 104, 106, and to output a behavior model 111, which also may be referred to herein as a BEhavior and Analysis Model, or abbreviated as a BEAM. As described herein, the behavior model 111 may generally represent and/or characterize various relevant components of, and information associated with, specific elements or portions of the models 104, 106. Further, the behavior model 111 may rely on characterizations of behavioral information of various resources associated with one or both of the models 104, 106.

Thus, the behavior model 111 may be understood to relate and describe relevant information from both of the models 104, 106, in a manner which is compatible with input to the continuity analyzer 108. As a result, a user of the system 100 may be enabled to make relevant, accurate, and timely predictions for use in decision making processes related any potential lack of continuity of business operations, including, e.g., decisions related to potential threats, risks, impacts, and recovery operations that may be associated with specific, predicted or potential business discontinuities.

In the example of FIG. 1, the model converter 102 includes a BPM handler 112 which may be configured to input and modify the business process model 104. Specifically, as described in example implementations below, the BPM handler 112 may be configured to associate, with each specific task or node of the business process model 104, a corresponding requirement (e.g., resource) which is necessary or useful in implementing the specific task. In particular, for example, the BPM handler 112 may be configured to provide such associations between tasks of the business process model 104 and associated resources of the IT topology model 106 which may be used to implement the task in question.

For example, a specific task and associated node of the business process model 104 may be associated with accessing a remote web service over a network, and implementing some functionality through the use of the remote web service. Consequently, it may be appreciated that such a task may require network connectivity, as well as associated hardware/software resources or accessing the remote web service, and perhaps for storing any subsequently received results. Meanwhile, the IT topology model 106 may include or represent various types of information which may be related to the providing of such network connectivity and associated hardware/software resources. For example, the particular task of the business process model may require a large amount of processing power and/or memory resources, and such resources may only be available with respect to some specific subset of resources of the IT topology model 106.

In some implementations, e.g., in the example implementation of FIG. 1, the BPM handler 112 may include an annotator 114 which is configured to associate requirements of specific tasks by annotating the relevant task of the business process model with information related to the associated requirement. That is, in this example, such annotations of tasks of the business process model 104 may be understood to represent discrete pieces of information which are specifically relevant to an associated task, in a manner which links the annotation to its associated task without disrupting an operation or execution of the task in question.

By themselves, specific types and implementations of such annotations are known. Moreover, it may be appreciated that the use of such annotations represents merely one type of example of relating associated human/hardware/software resources required for execution of a task of the business process model 104 to the task in question, and that any known or future technique for providing such relationships between the task and its associated resource(s) may be used in conjunction with implementations of the BPM handler 112. Nonetheless, for the sake of illustration, specific examples of the use of the annotator 114 are described in detail herein. For example, as described below, in the example of FIG. 3, the use of the annotator 114 with respect to the business process model 104 may result in a business process annotated model (BPAM) which may be useful in facilitating creation of the behavior model 111.

Somewhat analogously to the BPM handler 112, an ITTM handler 116 may be configured to input, modify, transform, and otherwise convert the IT topology model 106 in a manner which also facilitates creation of the behavior model 111. In this context, it may be appreciated that the IT topology model 106 may include or reference a relatively large amount of information or content which may not be relevant to creation of the behavior model 111. For example, it may occur that the IT topology model 106 is generally applicable to, or generic with respect to, a number of different business process models, of which the specific business process model 104 is thus merely one example. For example, the business which owns, operates, or otherwise utilizes the IT resources associated with the IT topology model 106 may have a large number of business process models in place, each of which may relate to specific departments, procedures, objectives, or other operations of the business. As a result, such business process models may or may not include tasks which require specific ones of the resources of the IT topology model 106.

Moreover, it may be appreciated that, as described above, the IT topology model 106 may represent a conventional IT topology model, which, as referenced, was not designed for business continuity analysis. As a result, the IT topology model 106 may simply contain various types of information which may be quite relevant to the description and administration or use of the IT topology in question, but which may not be needed or desired in the context of the business continuity analysis of the system 100 of FIG. 1. As a result, the ITTM handler 116 may be configured to filter or otherwise modify the IT topology model 106 in a manner which facilitates the use thereof in the context of the creation of the behavior model 111.

Specifically, in the example of FIG. 1, and in various examples that follow, the ITTM handler 116 may include, or access, a business continuity (BC) transformer 118 which may be configured to implement the various filtering and other modifying operations described above. For example, as described below with respect to the example of FIG. 3, the BC transformer 118 may be configured to access a library of related information which describes the types and characteristics of information associated with the IT topology model 106 which should be removed or modified. As may be appreciated, the BC transformer 118 may utilize such library information in a specific manner in a given context, e.g., with respect to the specific models 104, 106 in question during a particular implementation of the system 100 of FIG. 1.

Thus, it may be observed that the handlers 112, 116 may be configured to transform the respective models 104, 106 in a manner which facilitates the subsequent use of the models 104, 106 during the creation of the behavior model 111. As may be appreciated, and as described herein, such operations of the handlers 112, 116 may be completely automatic, may rely in part on additional or alternative human modifications, and/or may automatically provide a result which may subsequently be modified or optimized by human interaction. For example, various editors associated with instances or variations of the GUI 110 may be associated with the handlers 112, 116, and may enable one or more users of the system 100 to make any desired modifications to the processes or results of the handlers 112, 116.

Upon completion of operations of the handlers 112, 116, or in conjunction therewith, a behavior model generator 120 may be configured to utilize an available behavior mapping 122 to convert the output of the handlers 112, 116 into the behavior model 111. Specifically, for example, the behavior mapping 122 may include a mapping of a specific behavior or set of behaviors to each resource or type of resource of the IT topology model 106, and/or to specific tasks of the business process model 104. For example, the IT topology model 106 may include a representation of a particular server computer. At any given time, such a server computer may exhibit one of a particular set of behaviors. For example, the server may be on and fully operational, may be on but with restricted functionality, may be idle or in hibernation, may be acting at partial or full capacity, may be off, or may be malfunctioning partially or completely. Such behaviors may be related to one another, or to other resources or behaviors thereof, and may be associated with various conditions related to transitions between such states.

Of course, different types of resources may be associated with different types of behaviors. For example, some resources may be stationary, while others may be mobile. Some resources may have network connectivity, while others may not. Some resources may be associated with various types of security restrictions, which may thus be associated with respective behaviors, while other resources may be limited for use by certain users or types of users. By themselves, such behaviors of conventional resources may be well known. However, the cataloging, description, and mapping of such behaviors to their corresponding resources within the behavior mapping 122 may be understood to enable the relating of such behaviors by the behavior model generator 120 to respective outputs of the handlers 112, 116, to thereby enable generation of the behavior model.

Consequently, the behavior model 111 may be provided to the continuity analyzer 108, so as to provide one or more various types of business continuity analyses based thereon. For example, as illustrated in the example of FIG. 1, a simulator 124 may be used to create, parameterize, and execute one or more simulations using the behavior model 111, so as to thereby provide a user of the system 100 with a type and extent of the various risks which may be simulated to occur with respect to maintenance of a desired level of business continuity. Further, such simulations may provide opportunities to design and test potential recovery operations, and/or other potential responses to possible interruptions or other discontinuities associated with one or more operations of the business process model 104.

Further in FIG. 1, the continuity analyzer 108 is illustrated as including a report generator 126, which may be configured to input the behavior model 111, and to output document-based reports (or other types of static reports) describing various data which may be relevant to, or helpful in, evaluating a potential future business continuity of operations related to the business process model 104. For example, as may be appreciated, and as described in detail below, the simulator 124 may be configured to provide a number of different types of interactive simulations designed to illustrate, e.g., graphically, factors which may be relevant to the business continuity analysis. As such, such simulations and other interactive business continuity analyses may be best suited for, or most desired by, users of the system 100 who wish to utilize such interactive environments to perform various different testing scenarios related to the business continuity analyses of operations of the business process model 104, and who may be relatively detailed or technical in their approach to such business continuity analyses.

On the other hand, the report generator 126 may be configured to provide static documents or other reports which may be desired by managers, reviewers, and other users of the system 100 who desire a relatively high level and/or static view of the outputs of business continuity analyses. In a specific, non-limiting example, it may occur that an engineer utilizes the simulations of the simulator 124 to test various different continuity scenarios and responses thereto, and who ultimately arrives at what is thought to be a best-case scenario (or selection of possible best-case scenarios) for achieving a desired level of business continuity. Subsequently, the engineer may provide the result of such testing in report form, where such reports may be generated by the report generator 126.

In FIG. 1, the model converter 102 and the continuity analyzer 108 are illustrated as being executed in association with at least one computing device 128, which may itself utilize at least one processor 128a in conjunction with computer readable storage medium 128b. Therefore, in a simplified example implementation of the system 100, the model converter 102 and the continuity analyzer 108 may execute on a single computing device, e.g., a workstation, personal computer, desktop computer, laptop computer, or on any sufficiently capable computing device, e.g., a notebook, netbook, tablet, or Smartphone or other mobile computing device.

In other example implementations, portions of the system 100 may be executed using one or more remote computers, while other portions of the system 100 are executed using one or more different, local computers, which may be connected to the one or more remote computers over a network (e.g., a public internet, or a corporate intranet). For example, a user of the system 100 may utilize a local computing device which includes a display for displaying the GUI 110, and may use the local computing device to remotely access a separate (e.g., server) computer, on which the model converter 102 and the continuity analyzer 108 may be executing.

More generally, it may be appreciated that virtually any single component of the system 100 of FIG. 1 may be executed functionally using two or more separate components. Conversely, it may occur that two or more of the components of FIG. 1 may be executed in a given implementation using a single component.

Figure 2:
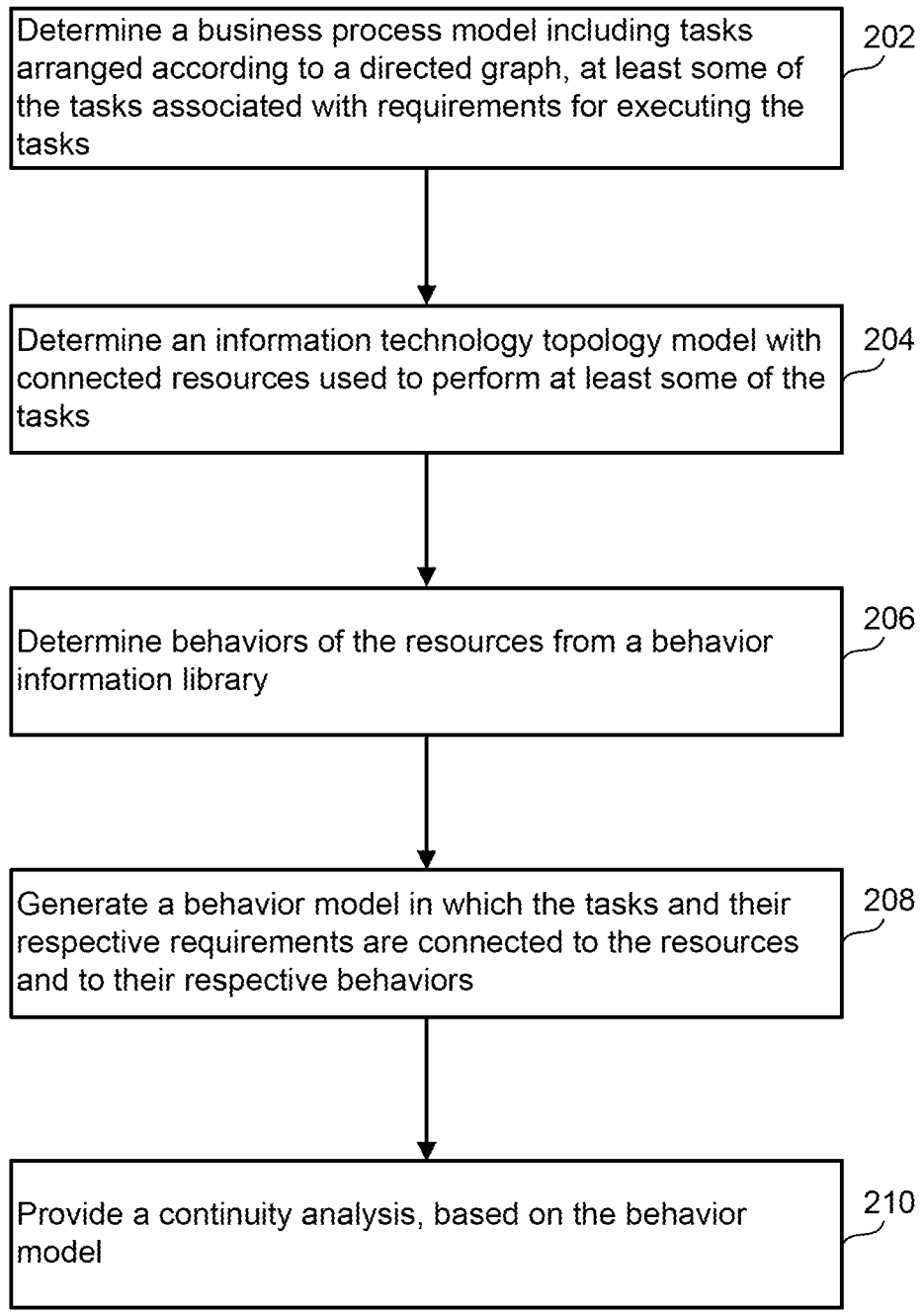
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. However, it may be appreciated that such illustration provides merely one example of possible implementations of the system 100 of FIG. 1. For example, in other example implementations, the operations 202-210 may be performed in a partially or completely overlapping or parallel manner. Moreover, additional or alternative steps, not specifically illustrated in the example of FIG. 2, also may be included, while one or more operations may be omitted.

In the example of FIG. 2, a business process model including tasks arranged according to a directed graph may be determined, where at least some of the tasks are associated with requirements for executing the tasks (202). For example, the BPM handler 112 may determine the business process model 104, e.g., directly in response to identification thereof by a business process expert or other stakeholder, or indirectly based on automatic identification thereof in response to provided selection criteria. As described, some or all the tasks may be associated with one or more hardware, software, or human resource, or combinations thereof, which may be required to implement the associated task. In some examples, the requirements may be included within the business process model 104, or may be annotated or otherwise linked to corresponding tasks. As described, such annotation or other linking or corresponding may be partially or completely performed automatically, e.g., by the annotator 114, and/or may be performed in whole or in part by a human user, e.g., a business process expert using an appropriate editor for business process models in the context of the GUI 110.

An information technology topology model with connected resources that are used to perform at least some of the tasks may be determined (204). For example, the ITTM handler 116 may be configured to determine the IT topology model 106. Again, such determination of the IT topology model 106 may be performed automatically, and/or may be performed directly or indirectly in response to a user indication or identification thereof. For example, certain business process models within a business may have some connection to particular instances of IT topology models. For example, business processes associated with a specific factory or other physical location may be at least presumed to be associated with locally-situated IT resources, so that the previous determination of the business process model 104 may automatically imply or indicate association with a specific IT topology model (or a specified set of such models), or vice versa.

Behaviors of the resources may be determined from a behavior information library (206). For example, the behavior model generator 120 may access the behavior mapping 122 in order to determine behavior information which is relevant to the specific resources of the IT topology model 106 which are associated as requirements of corresponding tasks of the business process model 104. As described herein, such behaviors may generally include, for example, a specific set of possible states or combination of states that may be associated with a given hardware/software/human resource, as well as various criteria for defining whether and when a given resource will be in a current one or more of such states, or will transition therebetween.

A behavior model in which the tasks and their respective requirements are connected to the resources and to their respective behaviors may be generated (208). For example, the behavior model generator 120 may input the business process model 104 (e.g., more specifically, may input the business process annotated model (BPAM) provided by the annotator 114), and may enter the modified version of the IT topology model 106 provided by the ITTM handler 116 (e.g., more specifically, the business continuity specific version thereof provided by the BC transformer 118). Thereafter, in conjunction with the previously determined behaviors, the behavior model generator 120 may generate the behavior model 111. Thus, the behavior model 111 may be observed to implicitly include an identification of, and relationships between, the various tasks, resources, requirements, and behaviors of the resources, in a manner which is amenable to business continuity analysis based thereon.

As a result, a continuity analysis may be provided, based on the behavior model (210). For example, the continuity analyzer 108 may provide various types of continuity analyses, based on continuity analysis results obtained from analyzing the behavior model 111. For example, as described, the continuity analyzer 108 may utilize such continuity analysis results in conjunction with the simulator 124, in order to provide, e.g., interactive simulations illustrating various possible present and future scenarios associated with predicted levels of business continuity, and potential responses to any predicted interruptions in such continuity. In other examples, the continuity analyzer 108 may include the report generator 126 which may generate, for example, static, text or graphics based versions of the continuity analysis, for review thereof when preferred in such context and formats.

Figure 3:
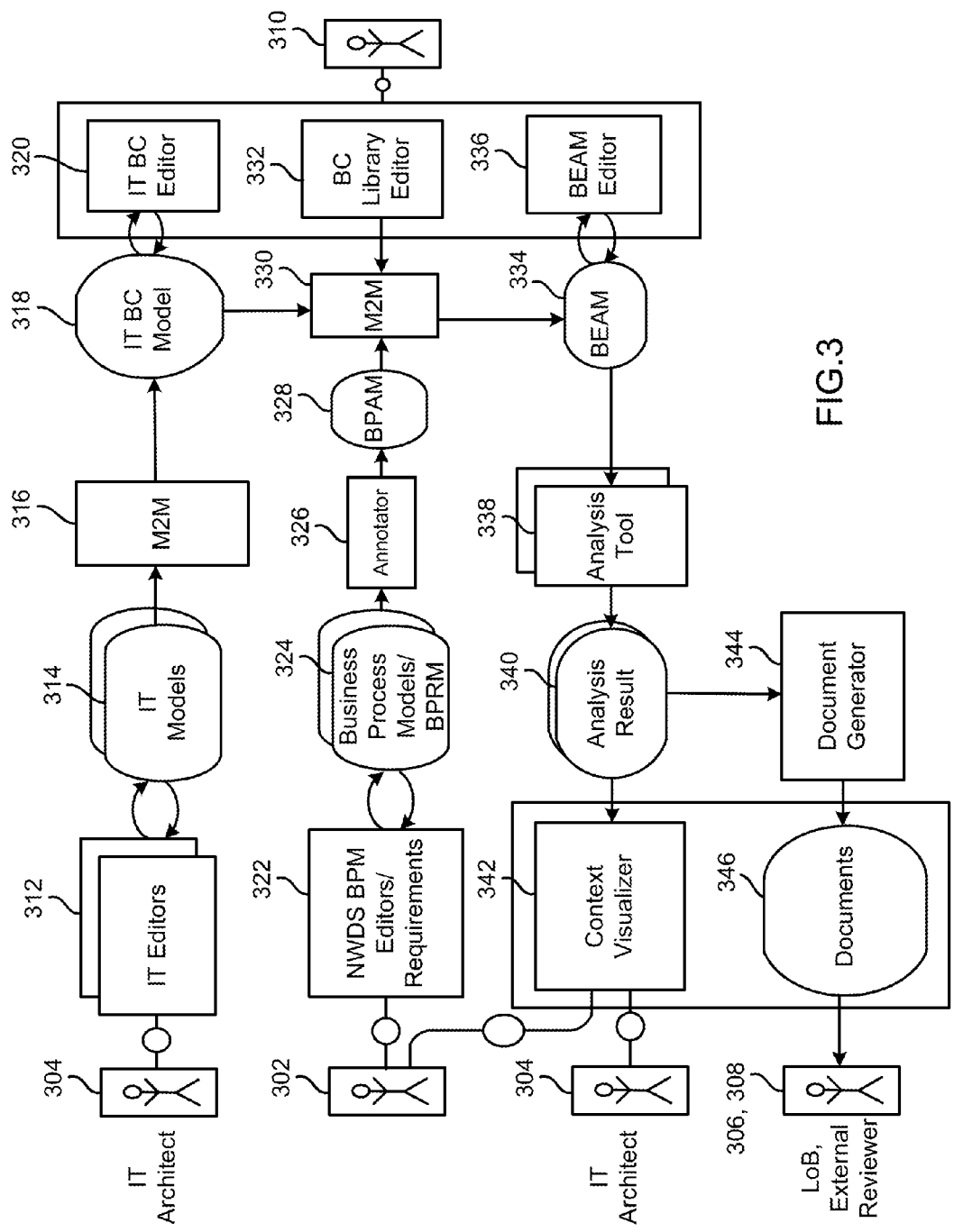
FIG. 3 is a block diagram of a more detailed example of the system of FIG. 1.

FIG. 3 is a block diagram of a system 300 illustrating more detailed example implementations of the system 100 of FIG.

1. In the example of FIG. 3, a plurality of users, referred to herein as stakeholders, are illustrated as stakeholders 302, 304, 306, 308, and 310.

Specifically, a stakeholder 302 may represent a business process expert who is responsible for designing and modeling business processes, such as, e.g., the business process model 104 of FIG. 1. The business process expert 302 may thus be responsible for ensuring that, e.g., all business process activities and operations are executable, and perform according to stated requirements, in order to achieve a desired business result.

The stakeholder 304 represents an IT architect, whose primary concerns include IT landscape deployment layouts, including management of the IT topology model 106. As referenced above, such an IT landscape may refer to a set of hardware, software, and network elements, arranged in a specific configuration, which serves as a fabric to support the business operations of an organization or other business. The IT architect 304 may thus be tasked with ensuring that the IT deployment layout is suitable to support an organization's business, and is capable of meeting business requirements, including business continuity requirements.

A line of business manager and/or process owner is represented by a stakeholder 306, and represents the stakeholder who is interested in an overall business process performance. For example, the stakeholder 306 may define process performance indicators which are aligned with an overall business strategy of an organization or other business. The stakeholder 306 therefore seeks the assurance that the business is capable of delivering products and services in a reliable manner, and notwithstanding disruptions or other discontinuities in the related business processes.

A stakeholder 308 represents an external order reviewer, whose tasks may include validation of the fact that an organization or other business has sufficient business continuity competency. For example, the external order reviewer 308 may be tasked to ensure that a business continuity analysis of a business is coherent, complete, current, and accurate. The business continuity analysis should contain all critical and important business processes, functions, independent resources, as well as potential risks. The external order reviewer 308 also may be tasked with validating that planned responses are appropriated and are sufficient to circumvent or to mitigate adverse effects of any potential business discontinuities.

The stakeholder 310 may represent a business continuity analysis who is responsible for managing and driving the business continuity analysis work. The stakeholder 310 is thus responsible for determining critical business processes, critical resources, risks to IT elements and business processes, and is also responsible for developing appropriate risk response strategies. The business continuity analyst 310 must therefore communicate analysis results to all other involved stakeholders (e.g., the stakeholders 302-308), and convey change requests to the business process expert 302 and the IT architect 304.

Thus, in the example of FIG. 3, the various stakeholders 302-310 may implement or otherwise utilize a variety of editors and other interfaces for use in performing their various tasks and responsibilities as outlined above. As may be appreciated, such editors and other interfaces may generally be represented conceptually by the GUI 110 of FIG. 1.

For example, the IT architect 304 may utilize one or more IT editors 312 in order to create, maintain, develop, implement, or otherwise utilize a plurality of IT models 314, where it may be appreciated that the IT model 314 may include, for example, the IT topology model 106 of FIG. 1. For example, the IT editors 312 may include functionality for graphically allowing the IT architect 302 to create, insert, or modify various thoughts, notes, or other elements representing the various IT resources, as well as connections there between. The implementation and use of such IT editors 312 and associated IT models 314, by themselves, may be otherwise conventional, except as described herein, and are therefore not described in more detail herein except as may be necessary or helpful in understanding operations of the system 300 of FIG. 3.

Further, a model to model (M2M) transformer 316 may be configured, as described above with respect to the ITTM handler 116, for conversion of the IT model 314 (e.g., the IT topology model 106), into a business continuity-specific model, represented in FIG. 3 of the IT BC model 318. As referenced, and described in more detail below, the IT BC model 318 may represent a filtered or otherwise modified version of the IT model 314 which is specifically tailored or customized for conversion into the corresponding behavior model (e.g., an instance of the behavior model 111), and otherwise to be compatible with, and useful in, the business continuity analyses of FIG. 3.

As also referenced above, the types of conversions implemented by the M2M transformer 316 may be partially or completely automatic, and/or may be supplemented by further human modifications, e.g., of the resulting IT BC model 318. For example, as shown, an IT BC editor 320 may be provided, e.g., for use by the business continuity analysis stakeholder 310 in performing any additional or supplemental modifications of the IT BC model 318, to thereby enhance its suitability with respect to formation of the behavior model 111 and associated aspects of business continuity analysis.

Further in FIG. 3, the business process expert stakeholder 302 may interact with and utilize one or more business process model (BPM) editors 322, which may enable the business process expert 302 to create, modify, maintain, and otherwise utilize a plurality of business process models 324, e.g., the business process model 104 of FIG. 1. Conceptually similarly to the editors 312 and models 314 in the IT environment, the editor 322 may enable the business process expert 302 to conveniently, e.g., graphically, arrange, connect, parameterize, and otherwise interact with various desired elements of the models 324. Again, as described above with respect to the elements 312, 314 of the IT environment, it may be appreciated that the BPM editor 322 and BPM 324 may otherwise be conventional, except as described herein, and are therefore not described in additional detail except as may be necessary or helpful in understanding the operations of the system 300 of FIG. 3.

As referenced above with respect to the BPM handler 112 and associated annotator 114 of FIG. 1, an otherwise conventional business process model 324 may be annotated, using, in the example of FIG. 3, an annotator 326, so as to obtain a business process annotated model (BPAM) 328. In the BPAM 328, as referenced above, the original business process model 324 may be annotated or otherwise supplemented with specific requirements for executing specific tasks thereof. For example, the business process expert 304 may use the editor 322 to submit specific task annotations in association with the annotator 326. For example, as referenced above, a specific task of the business process model 324 may be executed using a particular type of hardware or software that exists within the relevant IT model 314. Then, the BPM editor 322 and the annotator 326 may be understood to associate such requirements with the selected task, so as to thereby obtain an annotated version of the task within the BPAM 328. Such annotation may be iteratively performed for any and all tasks of the business process model 324, until the BPAM 328 is complete.

Using the thus-formed IT BC model 318 and the BPAM 328, a model to model (M2M) transformer 330 may be used in conjunction with a BC library editor 332 to output a behavior and analysis model (BEAM) 334 which conceptually represents the behavior model 111 of FIG. 1. That is, as described above with respect to the IT BC model 318 and associated IT BC editor 320, the BC library editor 332 may represent an editor available to the business continuity analyst 310 which enables the business continuity analyst 310 to provide input to, and modifications for, operations of the M2M transformer 330 in converting the IT BC model 318 and the BPAM 328 into the BEAM 334. Similarly, a BEAM editor 336 also affords the business continuity analyst 310 an opportunity to perform any desired or necessary modifications of the BEAM 334 prior to commencement of continuity analysis.

Specifically, as described above with respect to the continuity analyzer 108, an analysis tool 338 may be provided which is configured to input the BEAM 334, and to output analysis results 340 which may thereafter be expressed or otherwise utilized in one or more of a variety of outputs or formats. For example, in the example of FIG. 3, the analysis results 340 may be provided using a context visualizer 342, so as to thereby provide, e.g., simulations, representations, or other (perhaps interactive) graphical renderings of the analysis results 340. As illustrated, such visual and/or interactive results presentations may be provided to one or more of the various stakeholders, including, for example, the business process expert 302, the line of business manager or process owner 306, or the IT architect 304.

As also shown in FIG. 3, and as referenced above in the context of FIG. 1, the analysis results 340 also may be utilized by a document generator 344, in order to provide a plurality of documents 346 which may include, for example, text or graphical representations of the business continuity analysis. In this way, the business continuity analysis may be presented in a format which is suitable for review by, e.g., a line of business manager, external order reviewer, or other stakeholder who is responsible for, e.g., providing a high-level or comprehensive review of the business continuity analysis.

Figure 4:
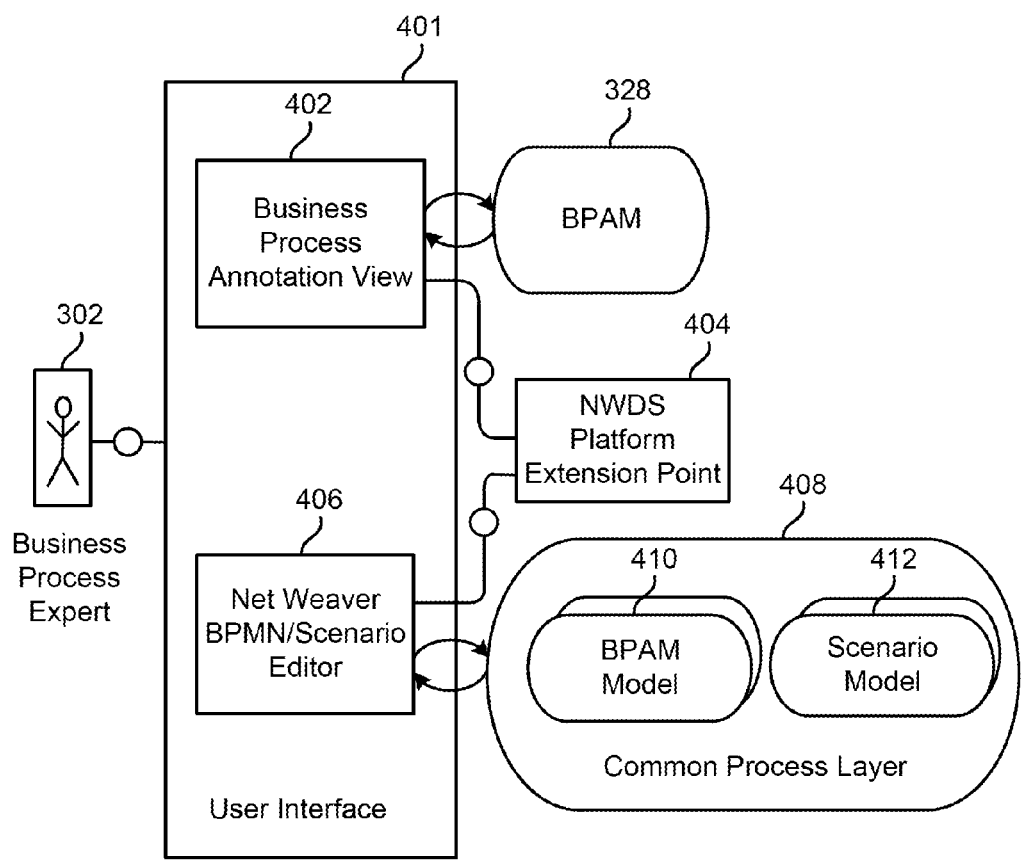
FIG. 4 is a block diagram of a subsystem of the system of FIG. 3 for providing annotations to business process models thereof.

FIG. 4 is a block diagram of a subsystem of the system 300 of FIG. 3 that is related to the management of the business process model 324. More specifically, FIG. 4 and the following figures are examples of such aspects of the system 300 of FIG. 3, demonstrated in the context of a business process modeling environment of the software manager of SAP AG of Walldorf, Germany. However, it will be appreciated that such examples are merely for the sake of example and explanation, and are not intended to be limiting in any way. For example, it may be appreciated that the systems 100 of FIG. 1 and system 300 of FIG. 3 may be implemented using, or in the context of, many different types of otherwise conventional existing or future software platforms.

Nonetheless, in the example of FIG. 4 and examples to follow, as referenced above, the illustrated subsystem is assumed to be implemented in the Net Weaver business process modeling environment (NW BPM) of SAP AG, which is generally known, in pertinent part, to be a solution for designing, modeling, documenting, and otherwise implementing business processes and associated business process models, such as, e.g., the business process model 104 of FIG. 1 and the business process models 324 of FIG. 3. As is known, the Net Weaver BPM supports process modeling based on the BPMN standard. The Net Weaver BPM provides at least two editor tools, known as the NW BPM process composer, or just process composer, in the NW business process (scenario editor). In other words, it may be appreciated that such editors and other user interfaces may generally represent, or provide examples of, the editor 322 of FIG. 3 as used in the context of the GUI 110 of FIG. 1. In the specific example, a process composer tool is known to provide graphical modeling of task or activity flows of the business process model, using the above referenced business process modeling notation (BPMN).

Thus, in the example of FIG. 4, it may be observed that the business process expert stakeholder 302 may interact with a user interface 401 which is used, at least in part, to provide the above referenced process composer tool and associated functionalities. In the specific example, the user interface 401 includes a business process annotation view 402, which allows the business process expert 304 to implement the above referenced annotation techniques with respect to the business process model 324, to thereby obtain and/or edit the BPAM 328.

In the example of FIG. 4, a Net Weaver development system (NWDS) platform extension platform port 404 represents a software module with functionality designed to integrate the business process annotation view 402 and the BPAM 328 into the existing Net Weaver development system context. In other words, as referenced above, FIG. 4 and following examples are illustrated as modifications or extensions of the existing Net Weaver environment. Thus, it may be appreciated that the extension point 404, in other contexts, may represent corresponding extension points which may be added thereto in order to modify conventional systems so as to obtain the business continuity analysis functionality described herein. Of course, in other examples, software systems may be built which directly integrate functionalities related to, e.g., the business process annotation view and other functionalities related to the types of business continuity analyses described herein, in which case, extension points such as the extension point 404 may be unnecessary.

In the example of FIG. 4, the platform extension point 404 is specifically illustrated as providing interoperability between the business process annotation view 402 and the otherwise conventional scenario editor 406. As shown, and as is generally known, the scenario editor 406 may be interoperable with a common process layer 408 which relates a BPMN model 410 (as an example of the business process model 324 of FIG. 3) with a corresponding scenario model 412. In this context, the term scenario model may generally refer to models which are used to organize a collection of business processes and provide an end to end view on such business processes. Thus, it may be appreciated that the BPMN 410 of the scenario model 412 are grouped into the common process layer 408 model set.

As described, FIG. 4 illustrates structure and functionality related to a phase of operation of the examples of FIGS. 1 and 3 above in which the business process expert 302 implements associated business process requirement analysis. Specifically, such business process requirement analysis generally relates to the association of specific, relevant requirements (e.g., hardware, software, or human resources which are required for execution of a corresponding task of the BPMN model (410), using the business process annotation view 402 to access the annotator 326 and thereby create the BPAM 328 as the output of processes associated with the example subsystem of FIG. 4.

Thus, FIG. 4 provides an example of a subsystem for capturing business requirements using a non-intrusive, model-driven mechanism to annotate existing business process models with supplementary information. Such techniques enable the business process expert 302 to capture business process requirements, constraints, and objectives that may be needed to conduct a comprehensive, coherent and thorough business impact analysis. In the specific example of FIG. 4, the extension point 404 mechanism may be configured to observe selection change events that may be provided by a corresponding process composer in a response to a selection of a specific business process task or activity by the business process expert 302. Such events may then be carried as payload information from the business process model. As a result, for example, if the business process expert 302 selects a single, particular process element (e.g., task or activity), then the business process requirement annotation editor associated with the annotation view 402 may be made aware of the selected elements. Subsequently, the business process expert 302 may enter a requirement related to the selected process element using corresponding business process requirement editors (e.g., to thereby associate the selected task with one or more corresponding IT resources). Thus, as described above, the BPAM 328 may be created and used to store the just-described business requirements and their associated references to corresponding process elements.

Figure 5:
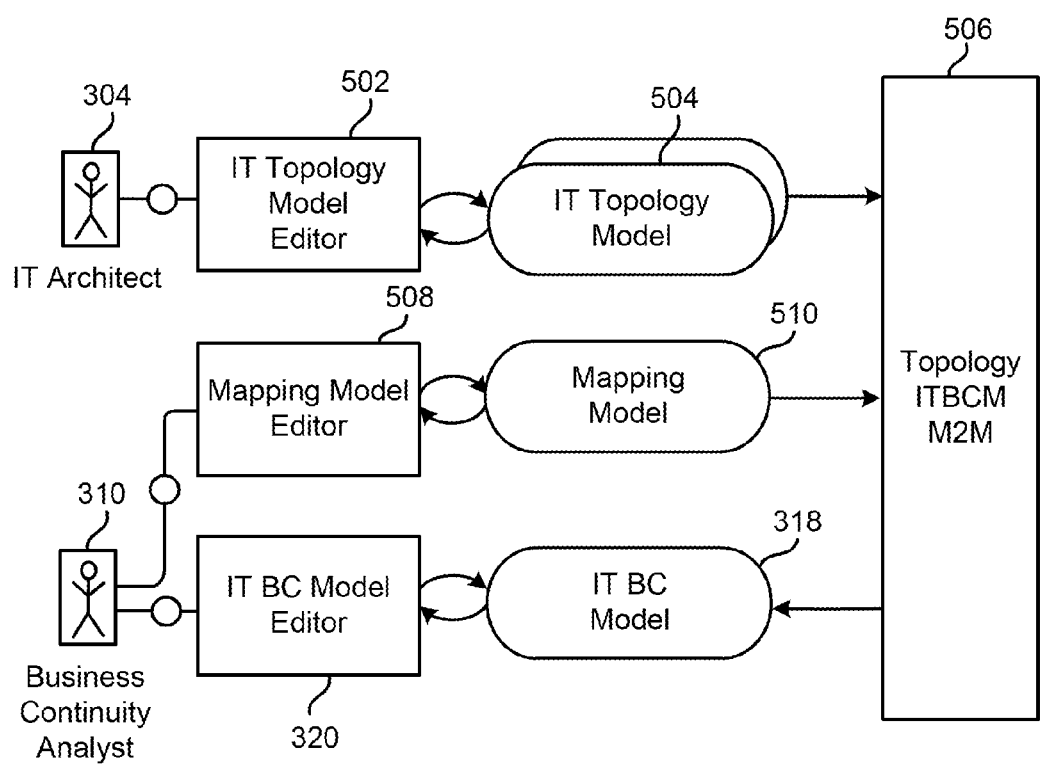
FIG. 5 is a block diagram of a subsystem of the system of FIG. 3 for converting an IT topology model into an IT business continuity (BC) model.

FIG. 5 is a block diagram of a subsystem of the system 300 of FIG. 3, illustrating structures and functions associated with the types of IT models 106, 314 that are referenced above. Specifically, in the above examples of FIG. 5, the IT architect 304 is illustrated as interacting with an IT topology model editor 502, which thus represents an example implementation of the IT editors 312 operating on the context of the GUI 110 of FIG. 1. Through the use of the IT topology model editor 502, the IT architect 302 may implement the IT topology model 504 as a specific, example implementation of the IT models 314 and 106. As described, the creation and editing of such IT topology models, by themselves, are well known.

Further in FIG. 5, a topology information technology business continuity model (IT BCM) model to model (M2M) transformer 506 is illustrated, as an example of the M2M transformer 316 of FIG. 3. As referenced therein, a mapping model editor 508 may be available to the business continuity analyst 310, so as to create and maintain a corresponding mapping model 510 which defines, e.g., filter parameters, definitions or documentation, and other rules for modifying, transforming, or otherwise converting the IT topology model 504 into the resulting IT BC model 318 of FIG. 3. As may be appreciated, over time, the structure of FIG. 5 implies that the mapping model 510 may be independently updated in a desired manner, whereupon operations of the subsystem of FIG. 5 may be repeated to thereby obtain a new, updated version of the IT BC model 318. As a result, it may be observed that the business continuity analyst 310 may obtain such an updated version of the ITBC model 318 in a straightforward, repeatable manner. As also referenced above with respect to FIG. 3, the IT BC model editor 320 may enable the business continuity analyst 310 to make any further revisions or updates to the IT BC model 318 that the business continuity analyst 310 may desire.

Thus, FIG. 5 and associated structures and operations may be understood to illustrate examples in which the IT architect 304 provides necessary domain knowledge and IT models which provide a consolidated and coherent view of such IT related resources that may thus be used to generate the IT BC model 318. Thus, existing models may be utilized to provide a familiar, extensive, and useful modeling base for the business continuity analyst 310. Moreover, the system of FIG. 3 and the subsystems of FIGS. 4 and 5, and related subsystems described herein, enable the business continuity analyst 310 to utilize graphical tools to design the IT BC model 318 in a desired fashion, e.g., by adding business continuity related information, connecting different resource dependency graphs, and otherwise connecting or modifying model elements in a manner conducive to the creation of a resulting behavior model. Thus, as described, the structures and associated operations of FIG. 5 may be configured to create and output the IT BC model 318. As described, the IT BC model 318 thus describes, for example, resource dependencies and risk modeling aspects of business continuity analysis.

In some example implementations, the business continuity analyst 310 may utilize the ITBC model editor 320 to create the ITBC model 318 manually. In other example implementations, as referenced above, the ITBC model 318 may be generated from the existing IT topology model 504. In such example implementations, such automated generation releases the business continuity analyst 310 from a significant amount of manual effort (which may be time-consuming), and does not require the business continuity analyst 310 to posses detailed knowledge of, e.g., IT landscape elements, configuration semantics, deployment options, and other detailed information related to a particular IT topology. Moreover, as also referenced above, the IT BC model 318 created in such an automated manner may represent complete, coherent and high quality models, which are less subject to human error.

As referenced above, the mapping model 510 may be designed to map, on a meta-model level, IT topology model classes to corresponding ITBC model classes. As described, the business continuity analyst 310 may use the mapping level editor 508 to facilitate such mapping.

Specifically, for example, IT deployment topologies may be modeled in various different model languages. For example, such modeling languages may include the common information model of SAP AG, or various other proprietary modeling languages. The meta-model based mapping approach of FIG. 5 thus enables the subsystem of FIG. 5 and the system 300 of FIG. 3, as a whole, to process virtually all model based IT deployment topologies and associated modeling languages. Specifically, such support may be provided by creating the corresponding mapping model for the respective IT topology model language.

Finally in the example of FIG. 5, as referenced above, the business continuity analyst 310 may use the IT BC model editor 320 to examine, refine, and finalize a corresponding model instance of the IT BC model 318. Further, the business continuity analyst 310 may add supplementary information to the IT BC 318 model, which may not be a conventional part of an IT landscape deployment topology. For example, threats, failure modes, and responses to risks are examples of such supplemental information.

Figure 6:
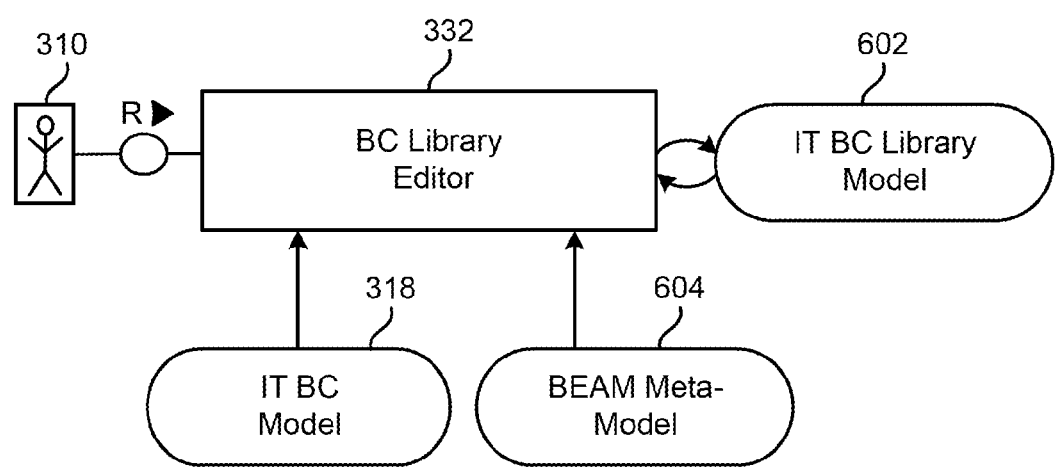
FIG. 6 is a block diagram of a subsystem of the system of FIG. 3 used to facilitate the model conversion operations of the subsystem of FIG. 5.

With reference to FIG. 6, it may be appreciated that the above description of FIG. 3 reflects operations in which the BPAM 328 and the IT BC 318 are utilized in conjunction with corresponding behavior information to create the BEAM 334, e.g., using the M2M transformer 330. As described, the business continuity analyst 310 may utilize the BEAM editor 336 to further refine the BEAM model 334, add measurement models, and add recovery plans, if desired. As described, the resulting BEAM 334 may thus be ultimately transformed into an input format which is compatible for or with the related continuity analysis tools, e.g., the analysis tool 338. For example, such additional modification or transformation of the BEAM 334 may be implemented using model to text (M2T) transformations.

Thus, the BEAM 334 represents a model of, e.g., behavior, performance, and analysis modeling aspects. The BEAM 334 refines the IT BC model 318 and the BPAM 328 using behavioral information of resources, and dependencies therebetween. Behavior modeling also may be used in detail recovery plans and measurement models that are used for defining BCM and KPIs for resources and business processes (e.g., the return time objective, which, as described below, generally defines a goal amount of time desired to return a failed resource to operational status). In general, the BEAM model 334 may be derived, in the context of the system of FIG. 3, by merging the IT BC model 318 and the BPAM 328 into a single, unified analysis model. In the specific examples described herein, the BEAM model 334 is derived in a series of three related operations. Specifically, in the first of such operations, the BPAM 328 is transformed into a first BEAM model referred to as an Alpha BEAM, while a second operation transforms the ITBC model 318 into a second BEAM model referred to as the Beta BEAM. Finally, a third operation merges the Alpha BEAM and the Beta BEAM into the final BEAM model, referred to herein as the Gamma BEAM.

Thus, as described below, FIGS. 6, 7, and 8 may be generally understood to represent subsystems of the system 300 of FIG. 3 that are used to create the Alpha BEAM. Specifically, with respect to FIG. 6, Thus, FIG. 6 illustrates an example subsystem related to the system 300 of FIG. 3 in which an IT BC library model 602 is used by the BC library editor 332 of FIG. 3 in conjunction with IT BC model 318 and associated BEAM meta-model 604. Specifically, FIG. 6 may be understood to illustrate an example implementation of the creation and use of the behavior mapping 122 of FIG. 1 in the context of FIG. 3. As described in detail below, the IT BC library model 602 may include various specific information related to particular IT resources (e.g., hardware or software resources) as well as associated states and corresponding behaviors thereof. Meanwhile, the BEAM meta-model 604 provides an overall framework for such state information for most or all potential or available IT topology models and associated resources.

As may be appreciated from the present description, the IT BC model 318 defines dependencies between various IT resources, but does not necessarily define, by itself, manners in which such resources behave or influence one another, particularly in the case of disruptions to business continuity. In the examples of FIGS. 6-8, such behavioral information may be added as described herein. For example, the business continuity analyst 310 may be supported in adding such behavioral information to a specific, selected IT BC model element(s). Additionally, or alternatively, particularly for relatively large or complex examples of the IT BC model 318, such manual addition of behavioral information may prove cumbersome and error-prone. Moreover, if the IT topology changes, the business continuity analyst will be forced to describe previous work and restart related BEAM construction processes.

Therefore, FIG. 6 may be understood to provide a framework for enriching the IT BC model 318 with associated behavioral information in an automated fashion, through the use of the IT BC library model 602 and the BEAM meta-model 604, in conjunction with the IT BC library editor 332. Specifically, the IT BC library model may be understood to map IT BC model element types to predefine BEAM behavior model elements, using the BEAM meta-model 604. For example, the IT BC model element type "server" may be mapped to a corresponding set of behavior states, such as, e.g., "off," "booting," "running," or "shutting down," and/or related transitions.

Thus, the approach of FIG. 6 may be understood to reduce manual efforts needed to model behavior information. For example, the business continuity analyst 310 needs to model behavior information a minimum number of times (e.g., once) for every IT BC model element type, e.g., for the types "server." Such behavioral information is then applied automatically to all occurrences of the same model element type in the IT BC model 318. Further, the business continuity analyst 310 similarly needs to define the IT BC library model 602 a minimum number of times (e.g., once). One such a library model is available, the whole process may be repeated as many times as needed, with no human interaction required. Consequently, automated creations of Alpha BEAMs are enabled, which may be useful or necessary in the context of frequently and dynamically changing IT landscapes.

Figure 7:
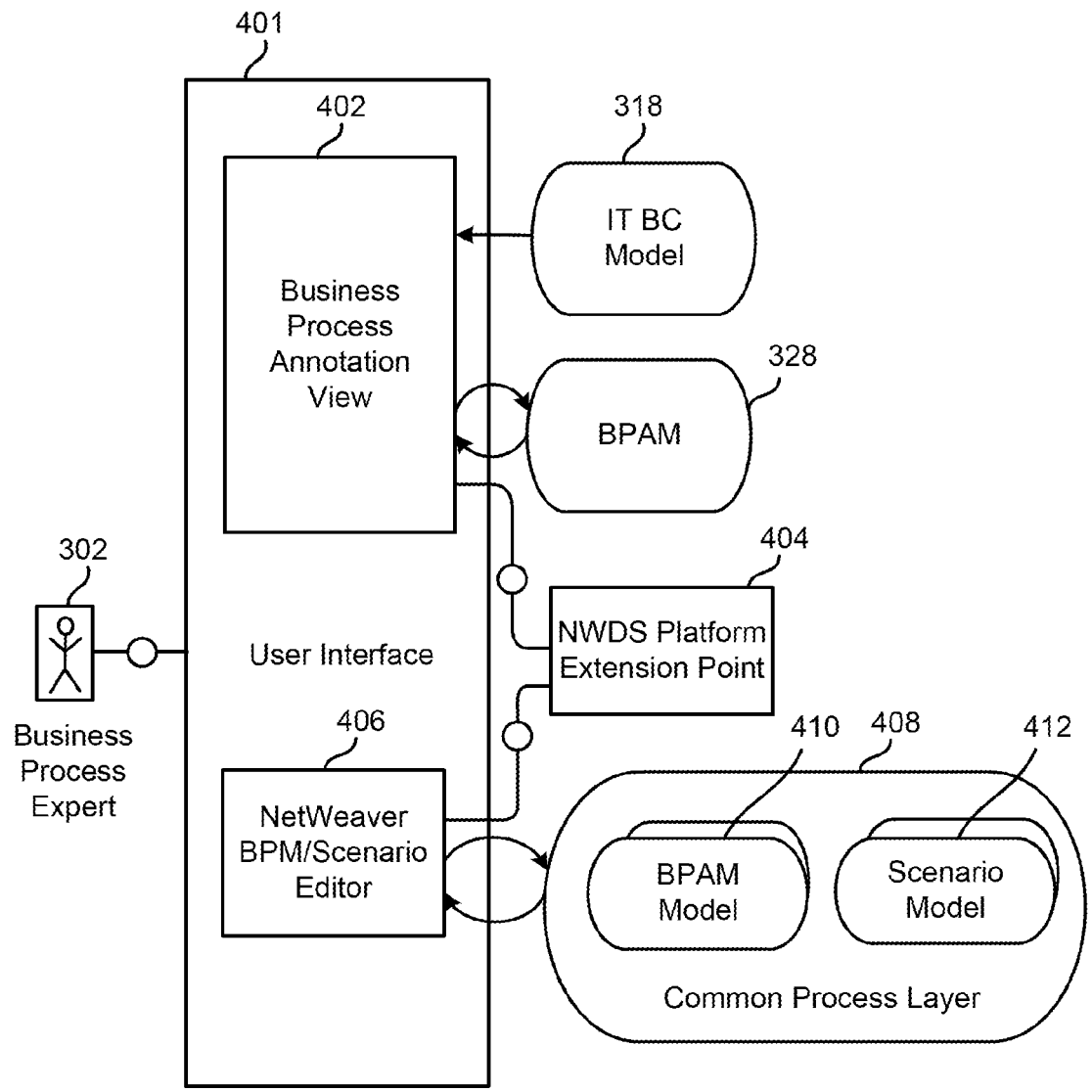
FIG. 7 is a block diagram of a subsystem of the system of FIG. 3 used to facilitate the annotations of the subsystem of FIG. 4, utilizing the BC model of FIGS. 5 and 6.

FIG. 7 illustrates an example use of the subsystem of FIG. 4 in the context of generation of a corresponding Alpha BEAM. Specifically, FIG. 7 illustrates that the types of business continuity analyses described herein are enabled with respect to specific (e.g., single ones of) tasks of the corresponding business process model. That is, the business continuity is analyzed at the business process activity level. As such, as described, FIG. 3 and related systems enable the identification of resources and other requirements of specific business process activities, and the establishment of links between such resources and activities. As referenced above, and illustrated again in the context of FIG. 7, such relationships may be established using the business process annotation view 402 in conjunction with the IT BC model 318 and the BPAM 328. In this way, such mappings between the resources and dependencies of the IT BC model 318 and corresponding individual task/activity elements of the BPAM 328 may be stored in conjunction with the BPAM 328.

Figure 8:
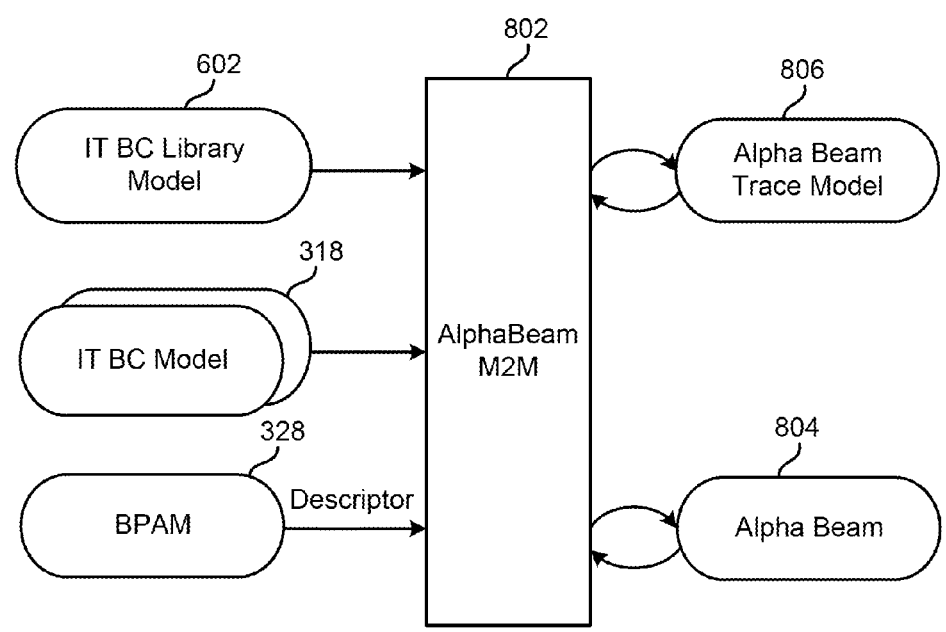
FIG. 8 is a block diagram of a subsystem of the system of FIG. 3 used to create a first behavior model.

FIG. 8 illustrates that once all required models are prepared, the resulting Alpha BEAM model may be derived. Specifically, as shown, an Alpha BEAM model to model (M2M) transformer 802 may be implemented which inputs the IT BC library model 602, the ITBC model 318, and the BPAM 328, to thereby output a resulting Alpha BEAM 804. As also illustrated, and described in more detail herein, the Alpha BEAM M2M transformer 802 also may be configured to construct an Alpha BEAM trace model 806. The Alpha BEAM trace model 806 may be understood to create a specific tracing or other linking between specific elements of the Alpha BEAM and corresponding specific elements of one or both of the IT BC model 318 and/or the BPAM 328. For example, a particular element of the Alpha BEAM 804 may be traced or linked to a particular server included as an element node within the corresponding, original, IT topology model 314 and/or the IT BC model 318. Similarly, a given element of the Alpha BEAM 804, and perhaps the same element, may be linked or traced to a corresponding, specific element of the original business process model 324 and/or the corresponding BPAM 328. In general, it may be appreciated that the use of the Alpha BEAM trace model 806, and its associated references to original model elements, may enable detailed and specific knowledge regarding a manner in which the Alpha BEAM 804 (and subsequent behavior models) relate thereto, so that relevant stakeholders (e.g., the IT analyst 304, business process expert 302, or the business continuity analyst 310) may be enabled to utilize knowledge gained in the context of behavior models, in the context of the source or original models.

Thus, the Alpha BEAM 804 may be understood to contain all resources, dependencies among resources, default behavior models, and references to related business process activity (or activities). As described with respect to the subsystem of FIG. 9 and subsequent figures, the related Beta BEAM, and ultimately the resulting Gamma BEAM, may be utilized to add and consider other related details of business processes, as described herein. Specifically, FIG. 9 illustrates a subsystem of the system 300 of FIG. 3 in which a Beta BEAM model to model (M2M) transformer 902 is utilized to transform the BPMN model 410, the scenario model 412, and the BPAM 328 into a corresponding Beta BEAM 904.

Generally speaking, purposes of the Beta BEAM 904 include the consolidation of different parts of the business process model which may span multiple process modeling and execution environments into a single end-to-end business process model. For example, conventional Net Weaver BPM models may not cover an entire business process, but rather may generally represent only an extended/customized part of such a process (e.g., a frontend extension of a backend process). Therefore, in order to enable end-to-end business continuity analysis, the Beta BEAM 904 consolidates the available, relevant process models 410, 412, 328 into an end-to-end business process scenario represented by the single Beta BEAM 904. That is, the Beta BEAM 904 may thus be understood to include the complete, relevant business process (and all associated process tasks/activities, gateways, path connections, and other relevant information). Moreover, as shown, all relevant business requirements documented in the BPAM 328 may be merged into Beta BEAM 904, as well.

Figure 9:
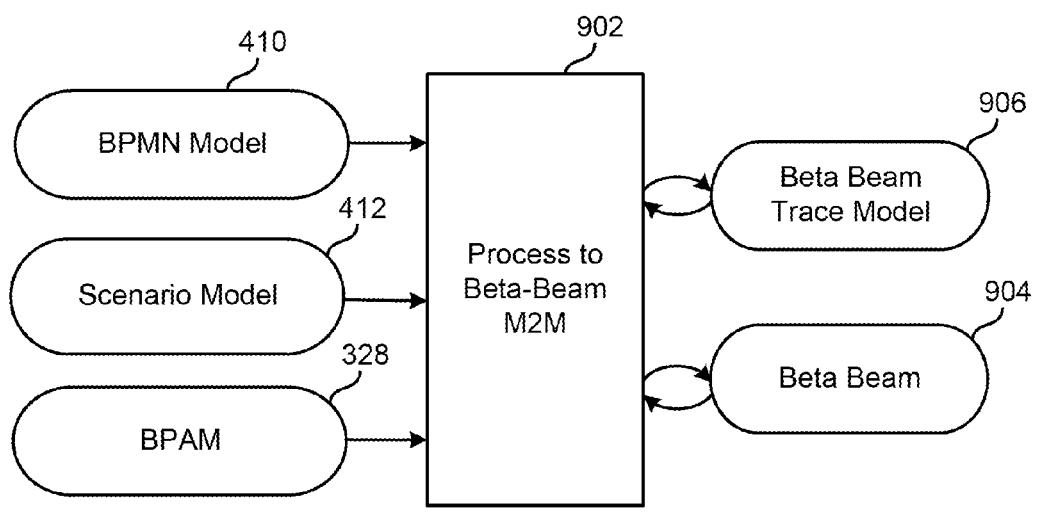
FIG. 9 is a block diagram of a subsystem of the system of FIG. 3 used to create a second behavior model.

As also shown in FIG. 9, the Beta BEAM M2M transformer 902 also may construct a Beta BEAM trace model 906 in conjunction with construction of the Beta BEAM 904. As referenced above with respect to the Alpha BEAM trace model 806, the Beta BEAM trace model 906 also may relate or link specific elements of the Beta BEAM 904 to corresponding singular elements of the underlying source models (e.g., the underlying business process models and IT topology models). As also described, such references may enable users to relate information determined in the context of the Beta BEAM 904 (or in the context of subsequently derived Gamma BEAMs, described below) back to original, source, model elements, so as to thereby perform corresponding analysis or otherwise take appropriate action.

Figure 10:
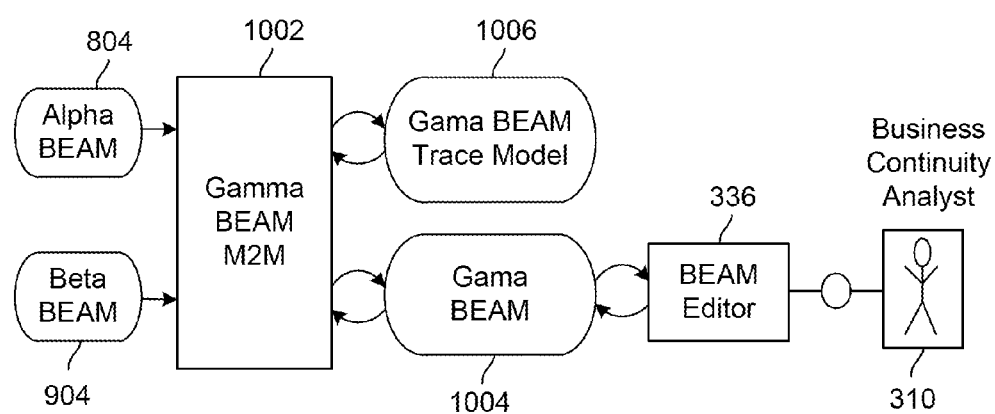
FIG. 10 is a block diagram of a subsystem of the system of FIG. 3 used to combine the first and second behavior models of FIGS. 8 and 9, respectively, to obtain a third behavior model.

FIG. 10 illustrates that, as referenced above, a Gamma BEAM model to model (M2M) transformer 1002 may be utilized to combine and otherwise transform the Alpha BEAM 804 and the Beta BEAM 904 into a resulting Gamma BEAM 1004. Further, as illustrated, the Gamma BEAM M2M transformer 1002 may construct a Gamma BEAM trace model 1006 which relates specific elements of the Gamma BEAM 1004 to corresponding elements of the original source business process and/or IT topology models, and/or to intervening models (e.g., the IT BC model 318 and/or the BPAM 328).

The Gamma BEAM 1004 thus represents a final BEAM model, and, as such, contains all necessary elements for business continuity analysis from both the business process and IT mapping domains. As illustrated in the example of FIG. 10, the BEAM editor 336 of FIG. 3 may be utilized by the business continuity analyst 310 to make further additions or refinements to the Gamma BEAM 1004. For example, the business continuity analyst 310 may wish to detail recovery plans, or modify resource behavior.

Figure 11:
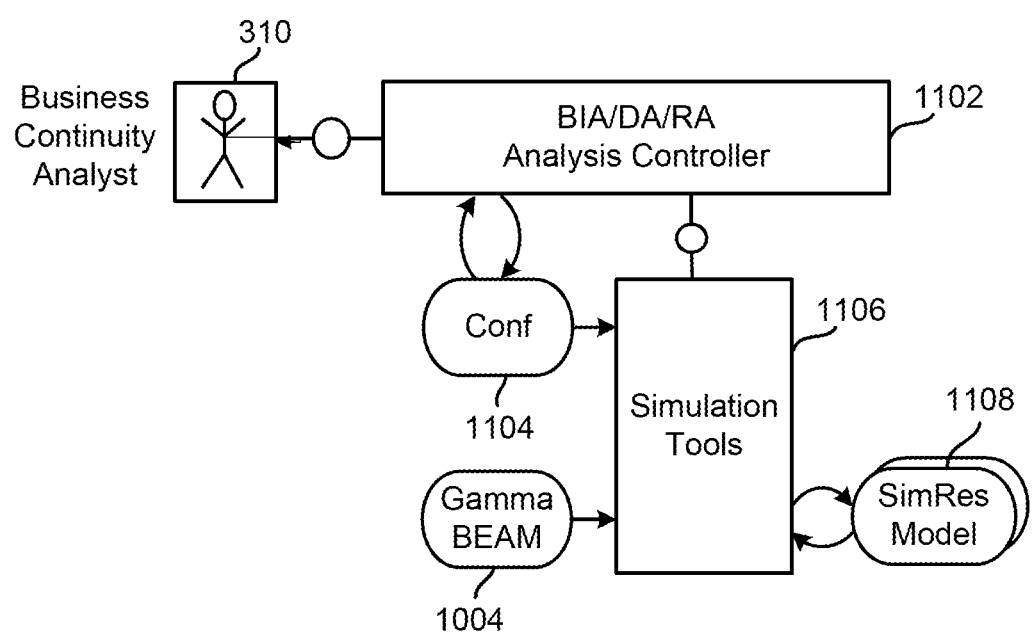
FIG. 11 is a block diagram of a subsystem of the system of FIG. 3 used to perform business continuity analysis using the third behavior model of the subsystem of FIG. 10.

FIG. 11 illustrates a subsystem of the system 300 of FIG. 3 which shows that the Gamma BEAM 1004 may be used as an input for various analysis and evaluation tools, as referenced above, e.g., with respect to the continuity analyzer 108 of FIG. 1 and the analysis tool 338 of FIG. 3. Specifically, as shown in FIG. 11, the business continuity analyst 310 may use an analysis controller 1102 to select a particular tool, based, for example, on a type of analysis to be executed. For example, in FIG. 11, such various types of analysis may include business, for example, business impact analysis (BIA), dependency analysis (BA), or risk or recovery analysis (RA). The resulting selection and associated information may be stored appropriately, for example, in a property file, illustrated in the example of FIG. 11 as configuration storage element 1104.

In the example of FIG. 11, the controller 1102 commands a simulation tool 1106 which inputs the Gamma BEAM 1004 in conjunction with the contents of the file 1104, to thereby output a simulation model 1108. More specifically, the simulation results model 1108 represents a structured representation of events and associated causes and consequences which may have relevant business continuity results. However, such analysis results may not be available in a presentable format, and/or may contain irrelevant or otherwise undesired or unneeded information.

Figure 12:
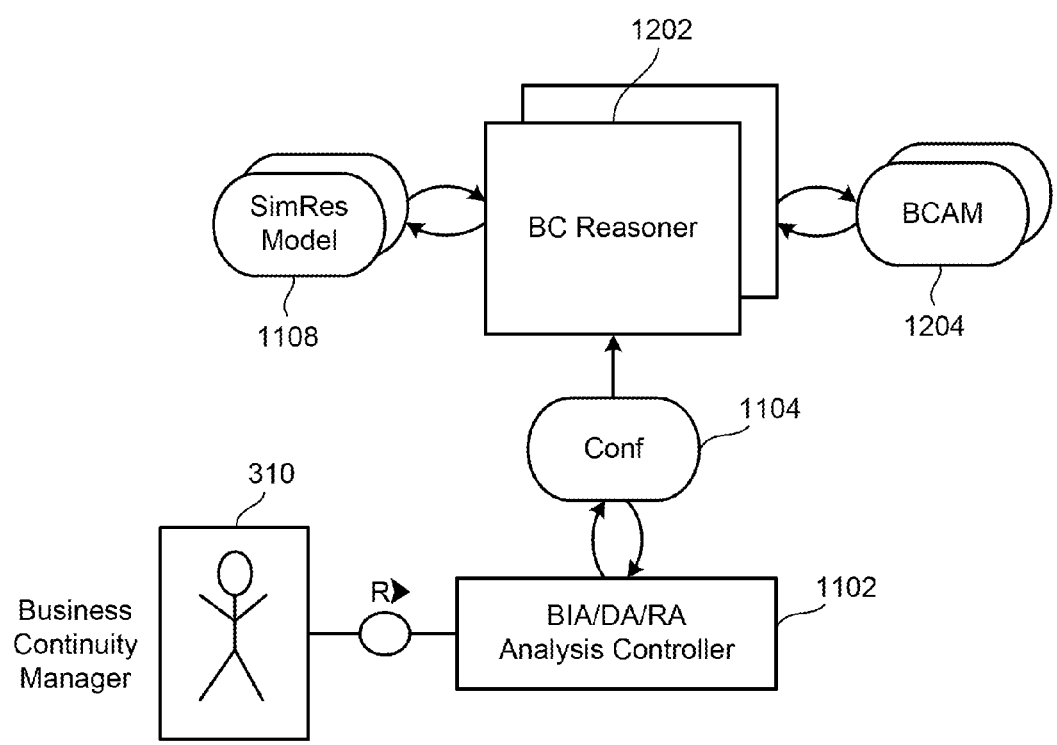
FIG. 12 is a block diagram of a subsystem of the system of FIG. 3 used to support the business continuity analysis of the subsystem of FIG. 11.

Therefore, FIG. 12 illustrates a block diagram of a subsystem of the system 300 of FIG. 3 which is configured to provide various types of post analysis filtering and reasoning with respect to the analysis results of FIG. 11. Specifically, as shown, a business continuity (BC) reasoner 1202 may be configured to act as a filter and pre-processor which transforms the analysis results 1108 into a business continuity analysis result model (BCAM) 1204, perhaps utilizing the configuration file 1104 described above with respect to FIG. 11.

Moreover, results from heterogeneous analysis tools may be meaningful only if correlated and interpreted in a single, homogeneous context. For example, an analytic tool may be able to compute a worst case and best case execution time for a recovery plan. On the other hand, a simulation tool may be configured to predict an average execution time of the same recovery plan. In order to determine whether the recovery plan as a whole needs to be improved, all such execution time values may be desirable or required. Consequently, the BC Reasoner 1202 may be configured to consolidate results from heterogeneous, multi-paradigm analysis tools, and to compute corresponding, relevant business continuity results. Such results also may be stored in the context of the BCAM 1204. As illustrated in the example of FIG. 12, operations of the BC reasoned 1202, e.g., the ability of the BC reasoner 1202 to input relevant business or IT events, and to analyze such events in a relevant fashion (e.g., to derive an average time to failure of an element and specific context, and/or, similarly, to calculate an average time of repair of the same element) may be executed under the control of the business continuity analyst 310 through the use of the analysis controller 1102, and its associated configuration property file 1104, as referenced above.

Figure 13:
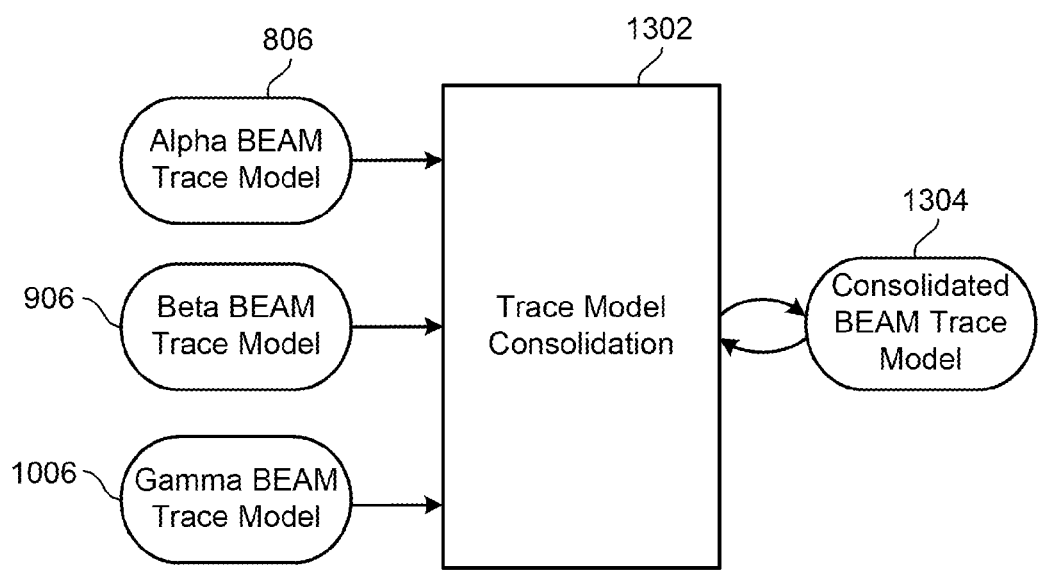
FIG. 13 is a block diagram of a subsystem of the system of FIG. 3 used to consolidate trace models of the first, second, and third behavior models of FIGS. 8, 9, and 10, respectively.

FIG. 13 is a block diagram of a subsystem of the system 300 of FIG. 3 illustrating specific implementations and uses of the various trace models 806, 906, 10006 described above with respect to FIGS. 8, 9, and 10, respectively. Specifically, as shown, a trace model consolidator 1302 may be used to create a consolidated BEAM trace model 1304. The consolidated BEAM trace model 1304 may be used to provide context sensitive results, and to relate analyses results with first model elements, using links that are preserved via the various trace models across the entire model transformation chain.

Thus, the various trace models of FIG. 13 and previous figures enable the computation of a transformation path from analysis results all the way back to corresponding, originating source model elements. The use of the consolidated BEAM trace model 1304 simplifies such computations by providing a single, merged trace model which is useful across all business continuity analysis result context.

Figure 14:
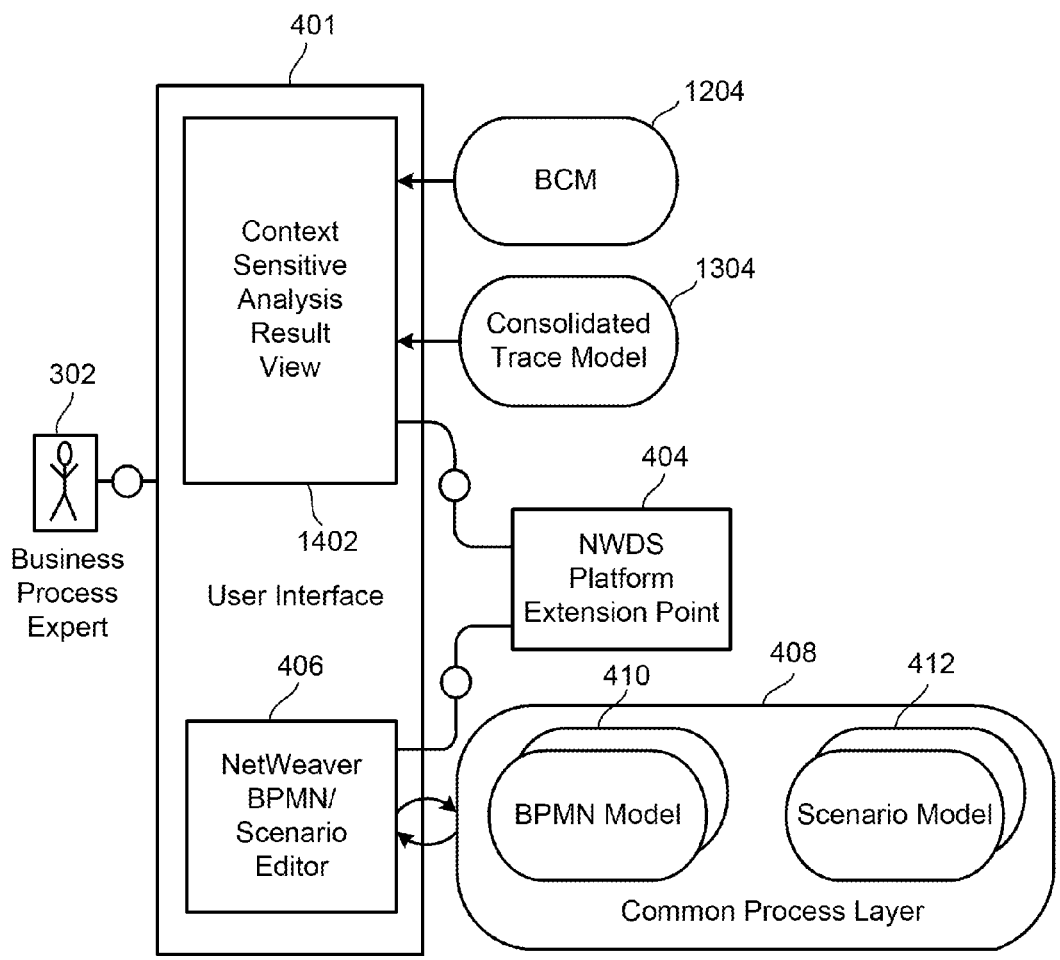
FIG. 14 is a block diagram of a subsystem of the system of FIG. 3 used to provide results of a business continuity analysis of FIG. 11.

FIG. 14 is a block diagram of a subsystem of the system 300 of FIG. 3 illustrating an example continuity analysis result presentation type. Specifically, FIG. 14 illustrates a subsystem for presentation of analysis results to various stakeholders 302-310, in their respective modeling environments, and may be referred to herein as context sensitive analysis result presentation, or interactive presentation.

For example, expected recovery time objective of a business process activity may be displayed to the business process expert 302, upon selection of a corresponding process activity by the business process expert 302 within his or her modeling environment. In this example, in FIG. 14, the business process expert 302 operates in his or her normal modeling environment, e.g., utilizing the user interface 401, but is nonetheless provided with an analysis result view 1402 which is customized for the modeling environment of the business process expert 302.

Thus, in the example of FIG. 14, the context sensitive analysis result view 1402 may use the same or similar mechanisms as the business process requirement editor described above in order to detect model element selection changes in the context of an otherwise conventional Net Weaver BPM process editor. In response to such selection change events, the context sensitive analysis result view 1402 may display analysis results related to the selected model element. For example, if the business process expert 306 selects a certain business process task or activity, the view 1402 may display analysis results for this specific process activity only.

The interactive presentation mode of FIG. 14 has a number of advantages. For example, it allows relevant stakeholders to visualize analysis results in their own modeling domains, so that such stakeholders are enabled to change the models accordingly (e.g., to alter a business process or an IT landscape model), and to thereafter get immediate feedback regarding how such changes may affect business continuity aspects of the relevant business process or IT landscape.

FIG. 14 illustrates that the context sensitive analysis results may be presented in the context of the business process expert 302. In particular, as shown, the BCAM 1204 and the consolidated trace model 1304 may be utilized by the context sensitive analysis result view 1402 in conjunction with the extension point 404 and the BPMN/scenario editor 406, in corresponding models 410, 412. Of course, the example of FIG. 14 represents merely one example of a context sensitive analysis result view, and it may be appreciated that similar context sensitive analysis result views may be constructed for other stakeholders of the system 300, e.g., may be constructed for the IT architect 304 utilizing the IT editor 312, or for the business continuity analyst 310 using a corresponding interface view.

As also referenced above, not all stakeholders of the system 300 may have at their disposal, or may wish to use, a dedicated modeling domain with sufficient tooling support to provide the type of interactive results described above, e.g., with respect to FIG. 14. Moreover, in some scenarios it may be desirable or required to disseminate analyses results to external stakeholders with no access to appropriate modeling tools (e.g., business continuity auditors).

Figure 15:
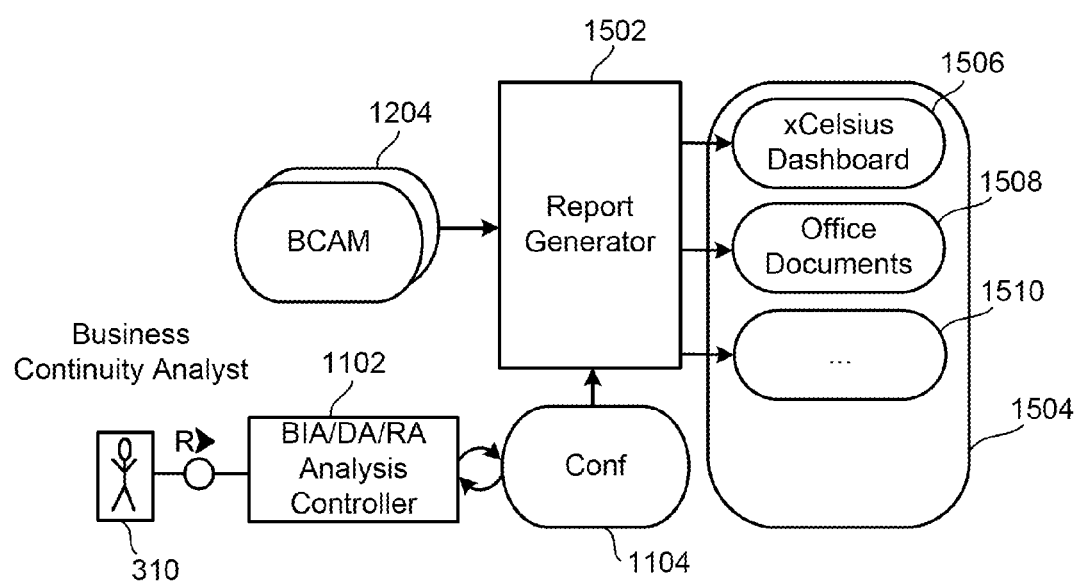
FIG. 15 is a block diagram of a subsystem of the system of FIG. 3 used to provide an additional or alternative analysis result.

Therefore, FIG. 15 illustrates an example presentation mode which provides an example of a document-oriented presentation mode, such as described above with respect to the report generator 126 of FIG. 1 and the document generator 344 of FIG. 3. Specifically, as shown, a report generator 1502 may take an input BCAM 1204, and various other information sources, such as may be contained within the configuration property file 1104, so as to thereby generate BC analysis report documents 1504 in various conventional formats or outputs (for example, as shown, an xCelsius dashboard 1506) may be provided, various conventional office document formats 1508 may be used (e.g., Microsoft Excel documents), as well as various other document-based presentation modes 1510.

The solution of FIG. 15 also supports chaining of two or more generators and associated generated results. For example, the xCelsius dashboard generator associated with the excelsior dashboard 1506 may utilize reports generated by a corresponding Excel document generator for the office document 1508 in order to produce the xCelsius dashboard 1506 themselves (e.g., where, as known, the xCelsius dashboard 1506 is an example of a otherwise conventional dashboard provided by SAP AG, and that similar dashboards or other document oriented presentations views may exist, and may be utilized, in various other proprietary settings).

As shown, the business continuity analyst 310 may utilize the analysis controller 1102 to control the document generation process of FIG. 15. As illustrated, the, e.g., BIA analysis controller 1102 may be used to orchestrate and configure report generators (and change of report generators), by way of the configuration files 1104.

Figure 16:
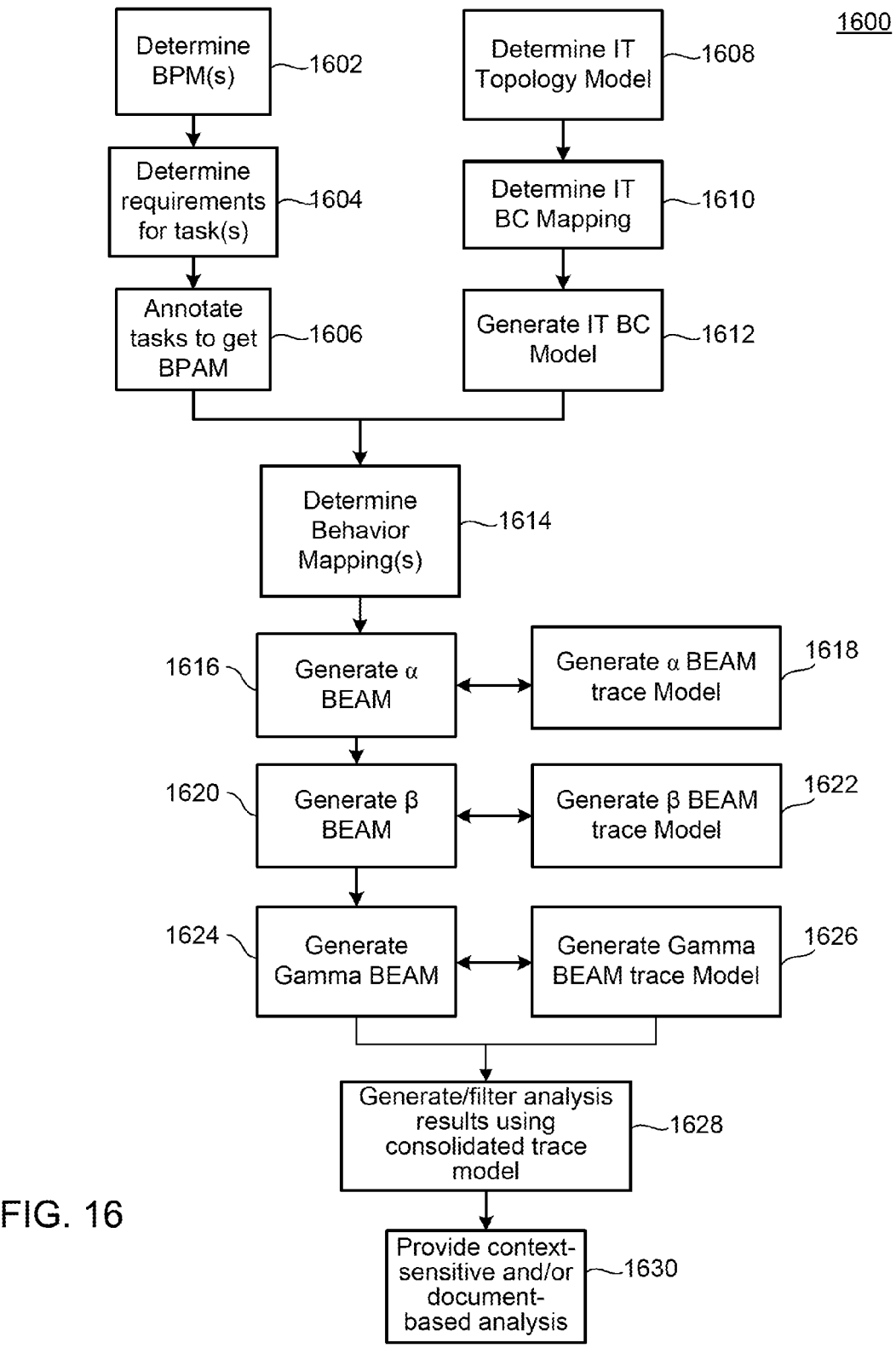
FIG. 16 is a flowchart illustrating example operations of the system of FIG. 3 and associated subsystems of FIGS. 4-15.

FIG. 16 illustrates a flowchart 1600 illustrating example operations of the subsystems of FIGS. 4-15 of the system 300 of FIG. 3. Specifically, as shown, in the example of FIG. 16, one or more business process models may be determined (1602). Associated requirements for individual tasks of the BPMs also may be determined (1604). For example, such requirements may be in the form of various IT hardware/software resources, and/or human resources. The requirements may be used to annotate a task of the business process model, in order to thereby obtain a business process annotator model (BPAM) FIG. 28 (1606).

In conjunction with the operations 1602-1606, an IT topology model may be determined (1608). Various associated IT BC mappings also may be determined (1610), which serve to act as a basis for transformation of the IT topology model into a generation of a corresponding IT BC model (1612). As may be appreciated from the above description, either or both of the IT topology models (e.g., the IT topology models 106, 314) or the IT BC model 318 may be used to define and relate associated IT resources thereof with requirements of corresponding tasks of a relevant business process model, e.g., the business process model 104 or 324 (1604).

Consequently, by determining relevant behavior mapping (1614), the Alpha BEAM 804 may be generated (1616), in conjunction with generation of the Alpha BEAM trace model 806 (1618). Similarly, the Beta BEAM 904 may be generated (1620), in conjunction with generation of the corresponding Beta BEAM trace model (1622). Subsequently, using the Alpha BEAM 804 and the Beta BEAM 904, the Gamma BEAM 1004 may be generated (1624), along with the corresponding Gamma BEAM trace model 1006 (1626).

Consequently, analysis results may be generated and filtered (1628), perhaps using a consolidated trace model, in order to thereby provide either context sensitive and/or document-based, business continuity analysis (1630). Thus, business continuity analyses may be performed in an automated, convenient, accurate, and widely applicable manner.

Thus, it may be appreciated that the example systems and operations of FIGS. 1-16 address various areas of need in today's business environments. Specifically, failures in business continuity, e.g., disruptions in an organization's IT infrastructure, may lead to financial losses, legal consequences, losses in reputation, and possibly bankruptcies. However, the systems and operations of FIGS. 1-16 provide business continuity analyses for supporting a business continuity plan which participates and addresses various expected threats and disruptions, using an integrated and coherent view of all involved business processes and IT related resources. More specifically, FIGS. 1-16 illustrate a novel, model-driven, non-intrusive approach which enables automatic consolidation of information from various stakeholders and multiple data sources, while providing multiple types of analysis tools (e.g., simulation tools and analytical tools).

Thus, the systems and operations of FIGS. 1-16 may be utilized in a variety of business context. For example, certain industrial sectors, e.g., energy, gas, oil, pharmacy, or finance, may be required to demonstrate a specified or regulated level of business continuity. Such regulation may be required, for example, because disruptions to the provision of operations of energy providers may result in a failure of heating, cooling, or other energy related services which, if disrupted, may result in severe inconvenient, and perhaps energy or loss of life for consumers of such energy services. Further, in financial or retail environments, disruption of business operations may result in a reduction or loss in sales or other transactions, which may result in an extensive loss of profit, or other consequences, for the businesses in question.

As referenced above, the business continuity analysis techniques of FIGS. 1-16 enable a number of different types of stakeholders to understand effects of adverse incidents on a business, as well as dependencies among business processes and resources, to thereby determine possible root causes of an adverse event. For example, as referenced above, business impact analysis (BIA) may be used to distinguish between mission critical processes and non-critical business processes. In particular, disruptions of business processes may have varying degrees of consequences (e.g., financially or legally), and/or may cause effects on other business values and indicators, e.g., reputation or customer satisfaction metrics.

Consequently, for each business process and function, various different business continuity metrics may be assigned. For example, the return time objective (RTO) and recovery point objective (RPO) are examples of business continuity metrics which may be effectively utilized in the context of FIGS. 1-16, where the RPO defines the maximum amount of data lost that an organization can sustain during an event, and the RTO defines a target time for resumption of a product, service, or activity delivery after an incident occurs. Meanwhile, the dependency analysis (DA) may be conducted to identify dependent resources, involved stakeholders, assets, and internal/external services related to a critical business process. Possible failure modes and disruption causes also may be identified.

In the context of FIGS. 1-16, the business continuity analyst 310 is thus enabled to analyze and otherwise determine how failures and disruptions may propagate through the systems and layers of a particular business. For example, a broken air conditioning unit may affect a particular data center, so that service deployed on that data center may fail, and may have propagating effects on other related portions of the corresponding business process models and IT topology models. Consequently, one or more recovery plans may be formulated with detailed necessary steps to restore business operations through defined levels of operations within given timeframes, utilizing the various types of analysis and business continuity metrics referenced above, as well as other various conventional analysis techniques and associated metrics.

The systems and operations of FIGS. 1-16 thus provide a model-driven, business process centric framework for business continuity management. The framework, as described, encompasses the entire stack of an enterprise or other business, including various different domains and layers (e.g., the business process domain), the service composition and execution domain, the IT infrastructure domain, as well as, as described in more detail below, associated facility items in Human Resources. Each domain may be modeled in detail by relevant domain experts (e.g., the business process expert 302, the IT architect 304, and other stakeholders described above).

As described, each such domain expert may utilize various different meta-models and tools to model and express the main specific needs. Such separation of concerns is advantageous, because every such model covers specific aspects of the respective domain, and may require or benefit from the expertise of the associated domain expert. In this context, it may be appreciated that business continuity analysis provides an example of a relatively rare need for a cross domain viewpoint on all such domains, in order to conduct a comprehensive and thorough business impact analysis and/or dependency analysis.

Further, the framework of FIGS. 1-16 provides various different types of analysis which may be used, for example, to quantify risks, validate recovery plans, and otherwise execute business continuity management. For example, the business continuity analyst 310 may be enabled to deal with various different types of issues related to business continuity analysis, across all layers of the enterprise stack, in an automated, straightforward, and reproducible fashion, and in a manner which integrates knowledge captured from different levels of the enterprise stack in different domain specific models, and across various different types of data sources.

For example, a business continuity issue such as a temporal failure propagation may relate to such scenarios as, e.g., an expected time delay until a broken air conditioner and data center causes specific types or extents of business disruptions. A business continuity issue related to performance analysis may include, e.g., a number of servers needed to guarantee a sales order processing time of six hours, even if one of the servers breaks down for two hours. A latency analysis (deadlock detection) may deal with such issues as may be related to recovery plans and associated return time (e.g., whether a recovery plan to repair a broken air conditioner, reboot all servers, and replay database transaction logs if sufficient to guarantee a business process RTO of less than four hours). In another example of a business continuity issue, a worse case (residual risk analysis) may result to a quantification of a likelihood that a given recovery plan may fail, partially or completely. A sensitivity analysis may relate to determination of a particular or a single point of failure. In a final example, an estimated value analysis may relate to a determination of an answer to such questions as whether the business is willing to spend $5000 per month for additional air conditioning units, in order to remove a 10% risk of a broken air conditioning unit, which, if it occurred, would cost the organization $70,000 in total.

As may be appreciated, the framework of FIGS. 1-16 would enable the business continuity analyst 310 to make intelligent, quantified decisions with respect to the resolution of the above, and other, types of business continuity issues. Moreover, as described above, the systems and operations of FIGS. 1-16 provide analysis results and associated presentations which take into account the fact that business continuity analysis results may need to be presented to the various stakeholders described herein, or other stakeholders.

As may be appreciated from the above description, each such stakeholder may have distinctive interest, and thus may have distinctive requirements as to how the business continuity analysis results should be evaluated and presented. For example, the business process expert 302 may be interested in determining how well certain business process activities perform in the event of disruptions, whereas the line of business manager stakeholder 306 may be more interested in the overall process resilience capability, and any potential impacts on strategic business values of adverse events. The IT architect 304 may have interest that are focused on the IT deployment requirements, while the external reviewer 308 may need to verify that it conducted business continuity analysis is complete, coherent, current, and covers all critical business functions. Further, each such stakeholder has a preferred environment in which he or she is best suited or most desirous of reviewing analysis results, and, as described in detail herein, the framework of FIGS. 1-16 easily enables the determination and providing of such context sensitive business continuity analysis results.

It may be appreciated that the above descriptions of FIGS. 1-16 provides examples in which available models, including the various business process models and associated IT topology models, are utilized to construct a corresponding behavior model which provides the basis for business continuity analysis. However, it may be appreciated that the use of such models is provided for the sake of example, and that other relevant models may be utilized, in addition to, or as an alternative to, the models described above.

For example, facility models may exist which include objects or nodes which represent specific geographical and other facilities-related information. For example, such facility models may represent various aspects of a specific facility, such as, e.g., available manufacturing elements (e.g., assembly lines), available offices, manufacturing areas, delivery areas, and other specified types of business-related areas and associated resources that may be included therein (e.g., furniture, parking, transportation in or between facilities, and any other information which may be related to an organization, structure, or relationship between elements of one or more facilities of a business in question).

As may be appreciated from the above description, such a facility model may be constructed using a corresponding facility model editor, by a corresponding facility model expert/stakeholder. Consequently, such a facility model may be converted into a facility business continuity (BC) model, which may thus serve as the basis for a related BEAM model (e.g., a Delta BEAM). Therefore, all of the above-described operations which are provided with respect to the Alpha BEAM and the Beta BEAM may be applicable and in such contexts as well (e.g., the construction of a corresponding Delta BEAM trace model). Moreover, such a Delta BEAM may be incorporated either with or instead of one or more of the described business process models and/or IT topology models, in order to obtain a final, consolidated Gamma BEAM model, and associated Gamma BEAM trace model and consolidated trace model which would include all of the Alpha BEAM, Beta BEAM, Delta BEAM, and Gamma BEAM trace models.

FIGS. 17-28 are screenshots illustrating example an use case(s) of an example implementation according to the systems and operations of FIGS. 1-16. Specifically, the examples of FIGS. 17-28 are intended to illustrate example user interactions and associated user interfaces, in the context of a simplified example implementation.

Figure 17:
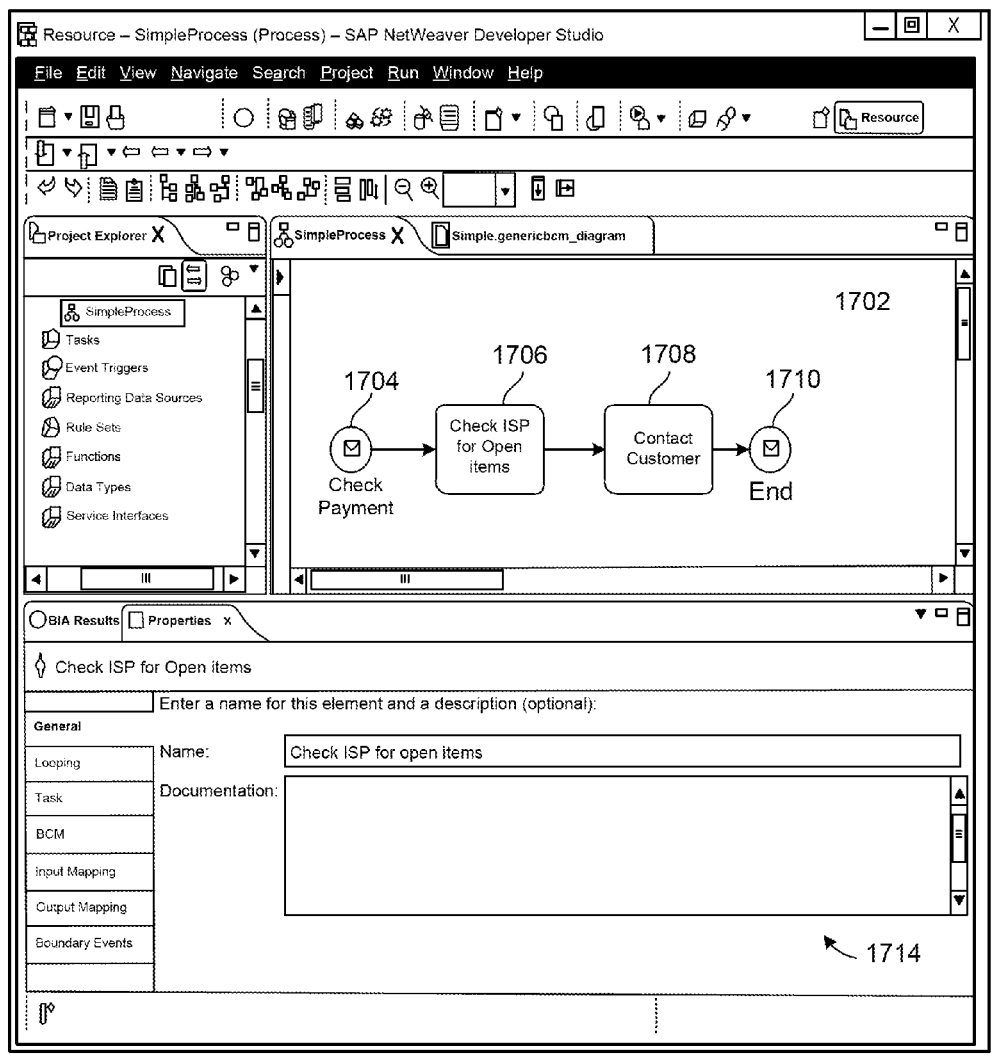
FIGS. 17-28 are example screenshots illustrating an example implementation of the systems, subsystems, and associated operations of FIGS. 1-16.

In the example of FIG. 17, a screenshot 1700 is illustrated which may generally correspond to the BPM editor 322 of FIG. 3, and which provides a base of interaction for the business process expert stakeholder 302. As may be appreciated from the above description, the screenshot 1700 thus includes a business process model 1702, which may be analogous to the business process model 324 of FIG. 3, or the business process model 104 of FIG. 1.

As shown, the business process model 1702 may begin with a check payment process 1704, which leads to a task node 1706 defined as "check ISP for open items," which itself leads to a task node 1708, "contact customer," before the business process model 1702 ends at node 1710. As shown, and as is well known, the interface of the screenshot 1700 may include various portions thereof with which the business process expert 302 may select and modify the business process model 1702.

For example, a portion 1702 provides a menu for selecting the business process model 1702, and for performing various operations and functions related thereto. Meanwhile, a portion 1714 is associated with a definition of a selected node from the business process model 1702. For example, as shown, the portion 1714 reflects, in the example of FIG. 17, a selection by the business process expert 302 of the task node 1706, and provides an opportunity for the business process expert 302 to, e.g., enter a name and description for the node element 1706, or to provide various other characteristics associated therewith. Of course, similar operations and features may be provided with respect to the node 1708, or any other selected node of the business process model 1702.

Figure 18:
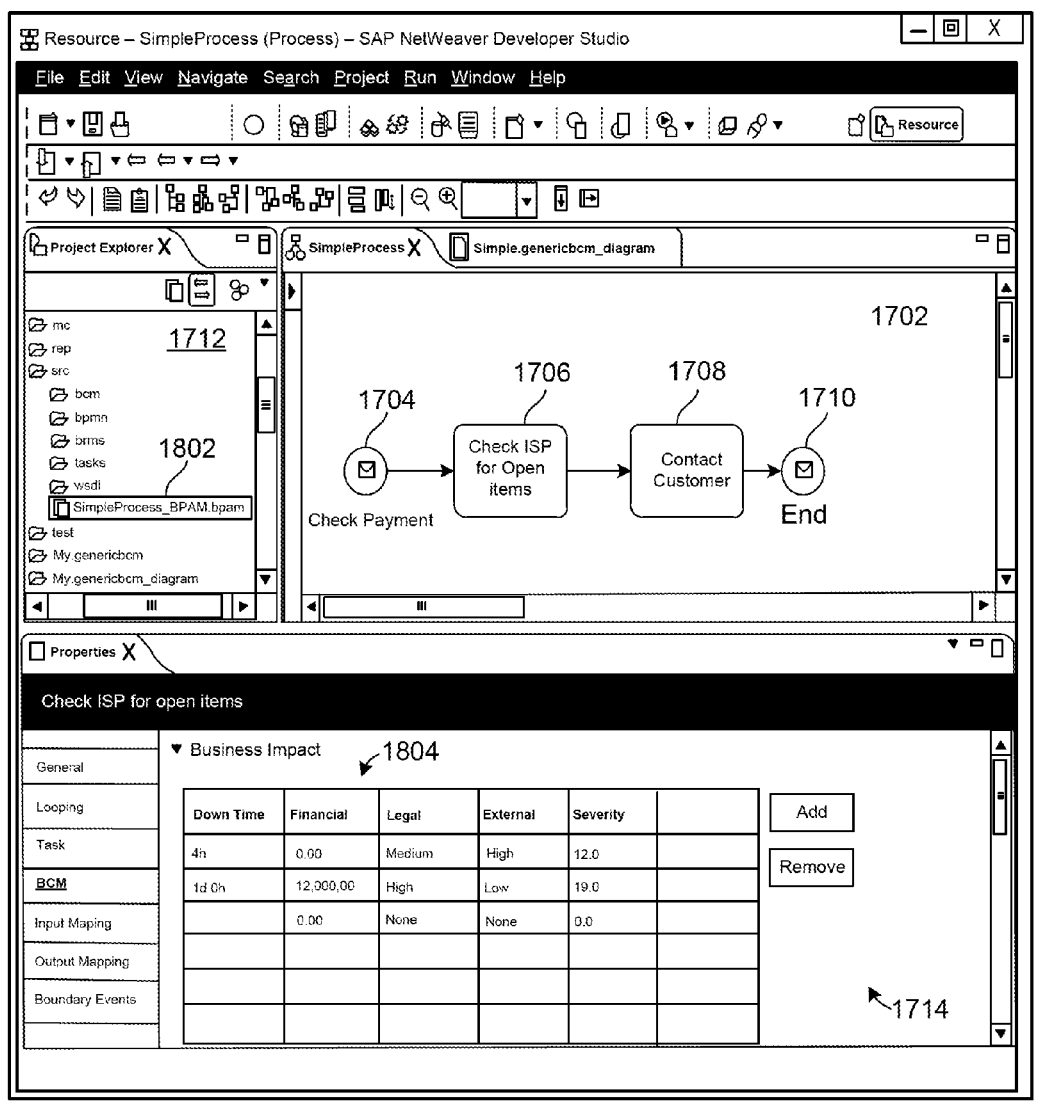

Once the business process model 1702 is completed, the business process expert 302 may proceed with annotation of business process requirements (e.g., a "business impact"), for each selected process activity node. For example, the screenshot 1800 of FIG. 18 illustrates such a business impact annotation for the activity 1706. That is, as shown, in the portion 1714, a portion 1804 which is associated with a business continuity management (BCM) selector tab is designed to provide the business process expert 302 with an opportunity to provide business impact parameters.

That is, as may be appreciated from the above description, business impacts may be considered to be consequences faced by the business if the business fails to execute certain process activities within given timeframes. For example, if the process activity 1706 is not available for a time period of one day, the business may lose $12,000, and there may exist a relatively high risk of potential legal consequences of some sort. As shown in FIG. 18, the portion 1804 provides a straightforward, graphical way for business process expert 302 to enter such business impact requirements, and other business process requirements. In this way, as described above, the association of such business process requirements by way of annotation to corresponding task nodes 1706, 1708, the business process expert 320 may construct the business process annotation model (BPAM) 328.

Figure 19:
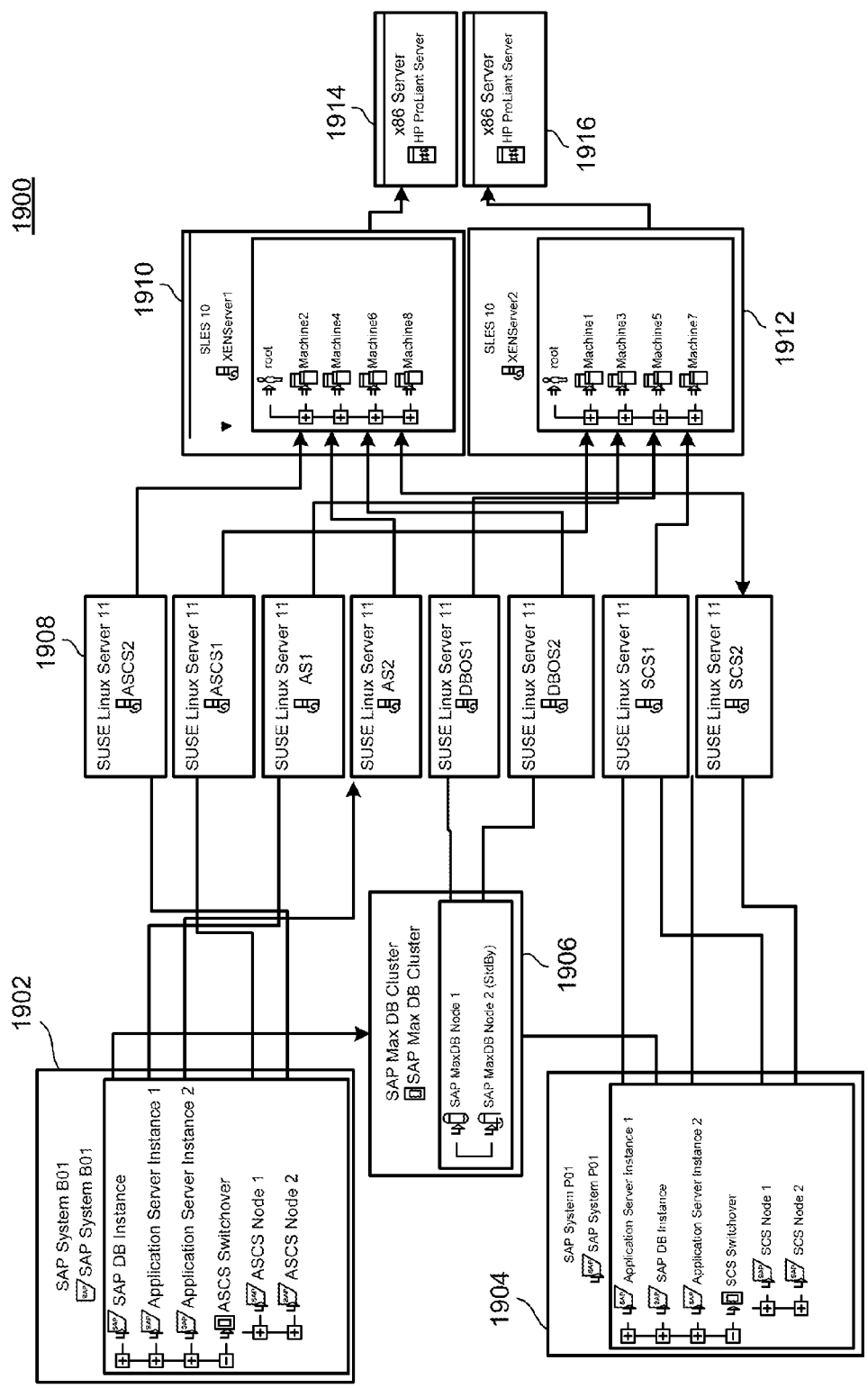

Meanwhile, the screenshot 1900 of FIG. 19 illustrates an example of an IT topology model, such as, for example, the IT topology model 106 of FIG. 1, or the IT model 314 of FIG. 3. Specifically, in the example of FIG. 19, various IT topology model elements 1902-1916 are illustrated. In the example, as may be observed, the illustrated IT topology model may include node elements 1902, 1904 related to corresponding SAP software systems, while node 1906 illustrates or represents a related SAP max DB cluster. Meanwhile, the node element 1908 illustrate a plurality of available Linux servers, while the nodes 1910, 1912 illustrate a pair of clusters of machines related to corresponding XEN servers. Finally in the example of FIG. 19, model elements 1914, 1916 illustrate example HP Proliant servers. As may be observed, the various model elements 1902-1916 may be graphically connected with one another in order to demonstrate real world connections there between.

The business continuity analyst 310 may thus use the IT BCM model editor 320 to manually enhance automatically derived IT BCM models (e.g., provided by the M2M transformer of FIG. 3) with any missing elements. Further, additional information such as risk information, recovery times, and impact delays may be provided.

Figure 20:
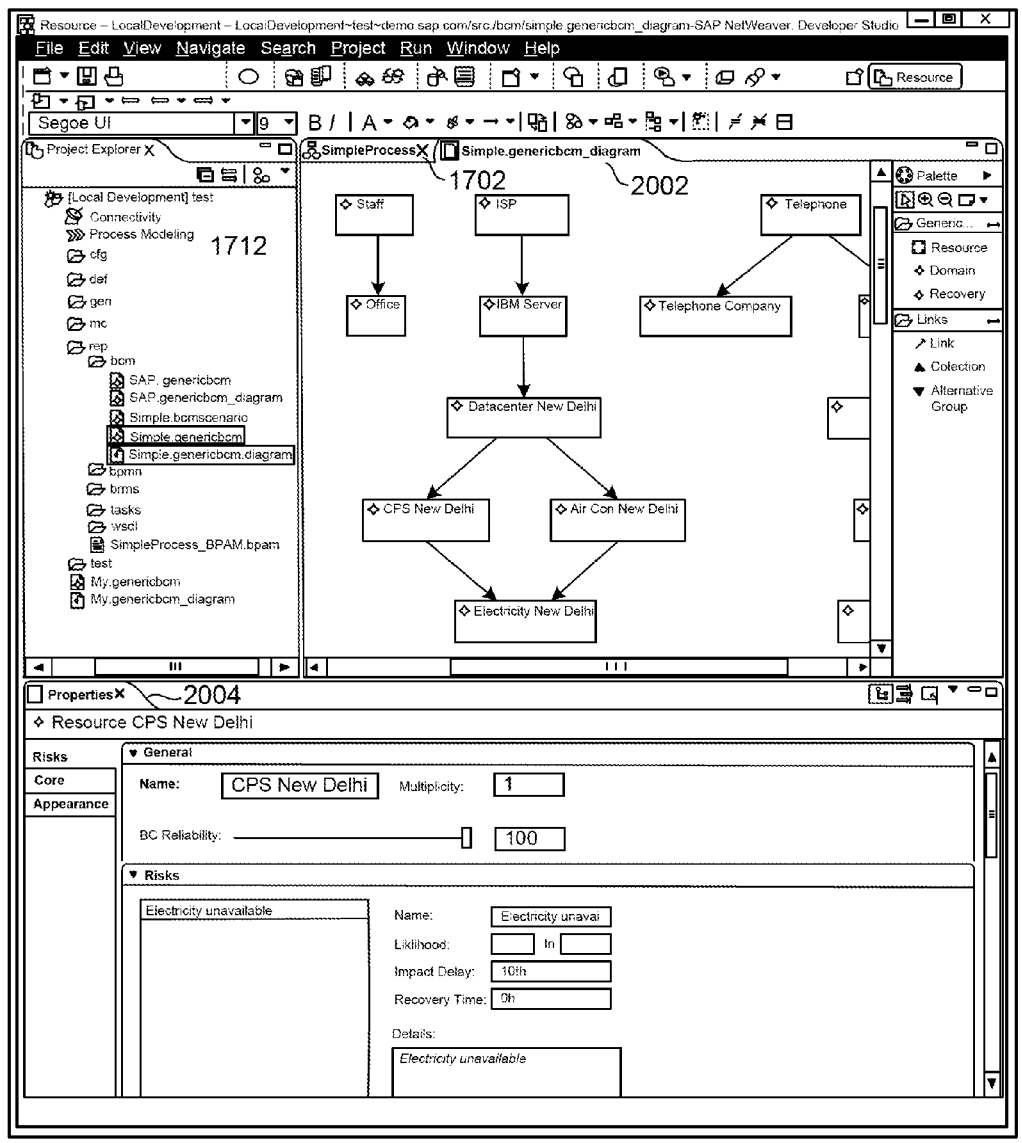

For example, the screenshot 2000 of FIG. 20 illustrates an example of an instance of such an IT BCM model editor that may be used by the business continuity expert 302. As shown in the example, a tab 2002 may be selected in order to illustrate an included instance of the IT BCM model and related editor elements, as selected using the explorer portion 1712. As referenced above, such a business continuity model also may include, or incorporate, a facilities model and associated model elements, e.g., representing a particular office, staff thereof, or other facility resources, such as, e.g., telephones. As may be observed, the IT BCM illustrated with the selection of the tab 2002 thus provides a simplified, business continuity relevant, version of the IT topology model of FIG. 18, in the context of providing illustrations of available resources that may be associated with the business process model 1702 of FIG. 17.

As referenced above, a tab 2004 may be related with, or may provide, an ability to supplement the IT BCM of the tab 2002 with related risk information, recovery times, and impact delays. Specifically, as shown, the tab 2004 provides an ability to enter such information for a selected model element (e.g., the model element "CPS New Delhi."). As also shown, the business continuity analyst 310 may thus enter, e.g., a measure of business continuity reliability (using the illustrated sliding task bar), and may enter associated risks (e.g., such as a potential unavailability or electricity), and associated impact delays (e.g., 10 hours) and recovery times, as well as a likelihood of occurrence of the potential risk.

Figure 21:
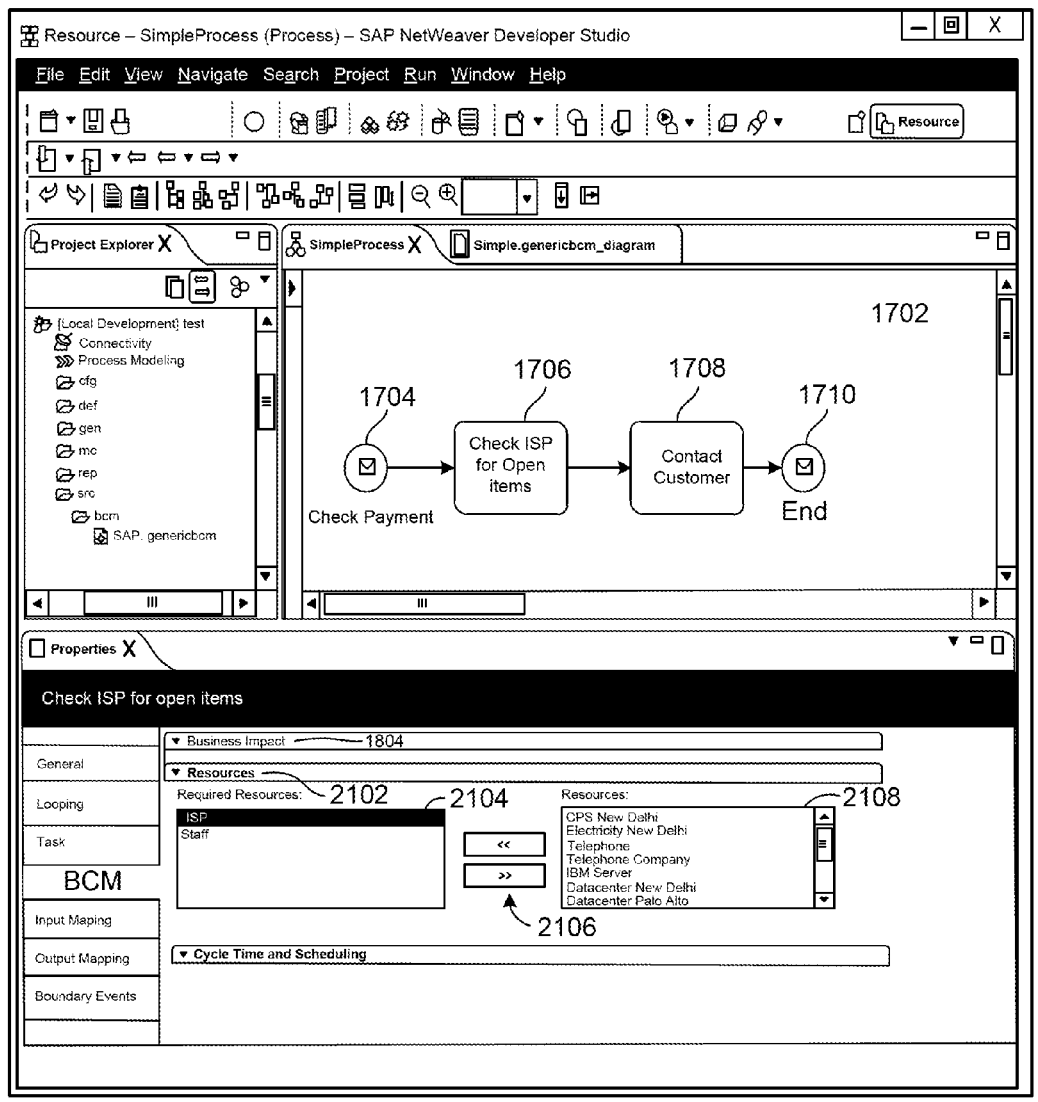

As shown in the screenshot 2100 of FIG. 21, the business process expert 302 may thus use the set of resources defined by the IT BCM of FIG. 20 in order to identify such resources which may be required to execute the business process of the business process model 1702. Specifically, as illustrated, the portion 1714 includes a portion 2102 for defining such resources. As shown, for example, a window 2104 may list required resources (e.g., ISP, staff) selected by the business process expert for addition to the window 2104 in response to selection of the button 2106, from a window 2108 which lists all available resources from the IT BCM of FIG. 20. Of course, similar resources may be added to, or associated with, the node 1708 of the business process model 1702, using the portion 1714, and upon selection of the node 1708 by the business process expert 302.

Figure 22:
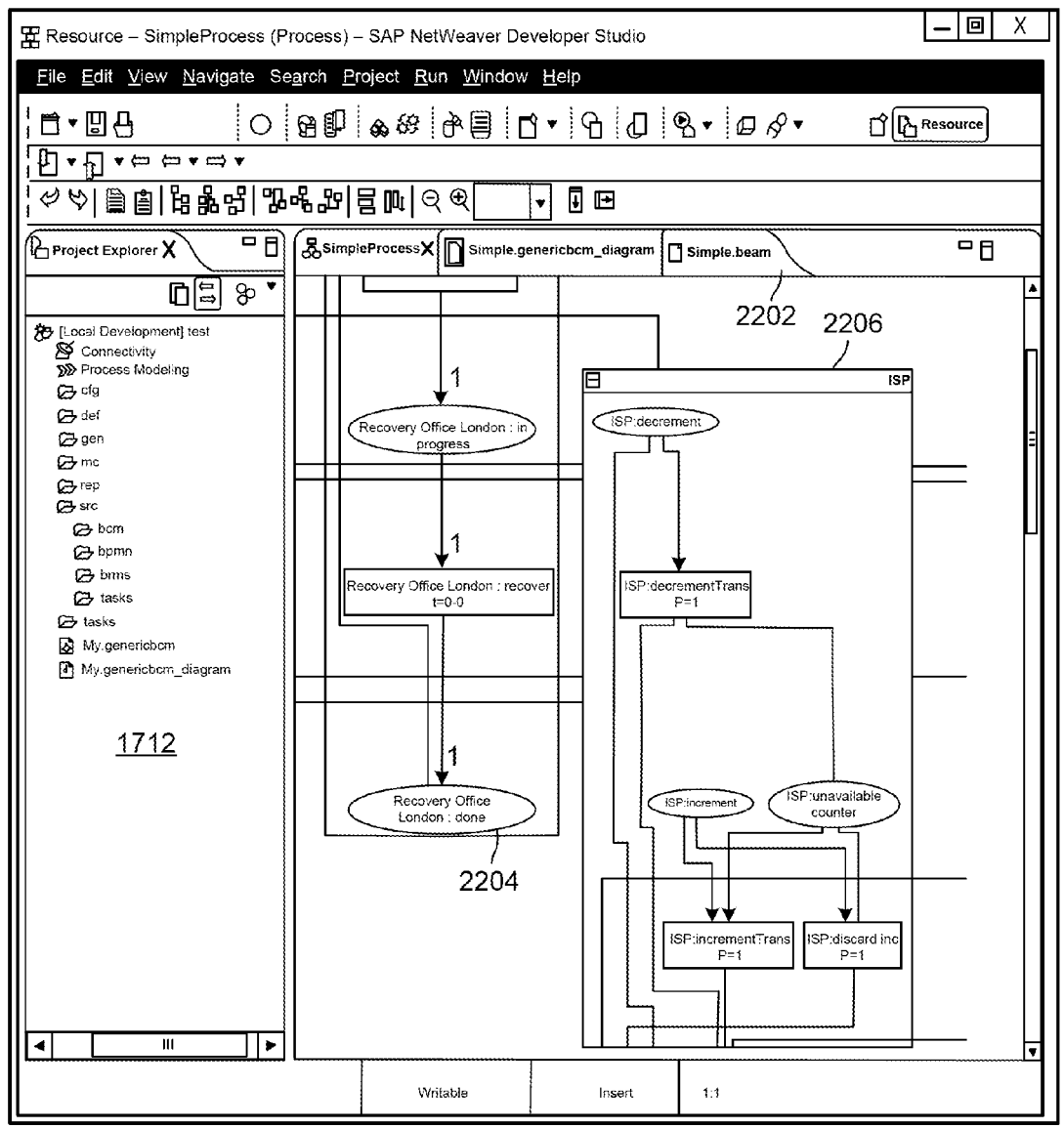

As shown in the screenshot 2200 of FIG. 22, once all such necessary resources are assigned to a business process as just described with respect to FIG. 21, the business continuity analyst 310 may be enabled to generate the BEAM (e.g., the BEAM 334 of FIG. 3 corresponding to the behavior model 111 of FIG. 1). Thus, in the example of FIG. 22, a tab 2202 is illustrated as being selected within a BEAM model editor (e.g., corresponding to the BEAM model editor 336 of FIG. 3), and including model elements 2204, 2206. As shown for the sake of example, the BEAM model element 2206 may relate to the ISP, and may illustrate associated behaviors that are associated therewith.

Figure 23:
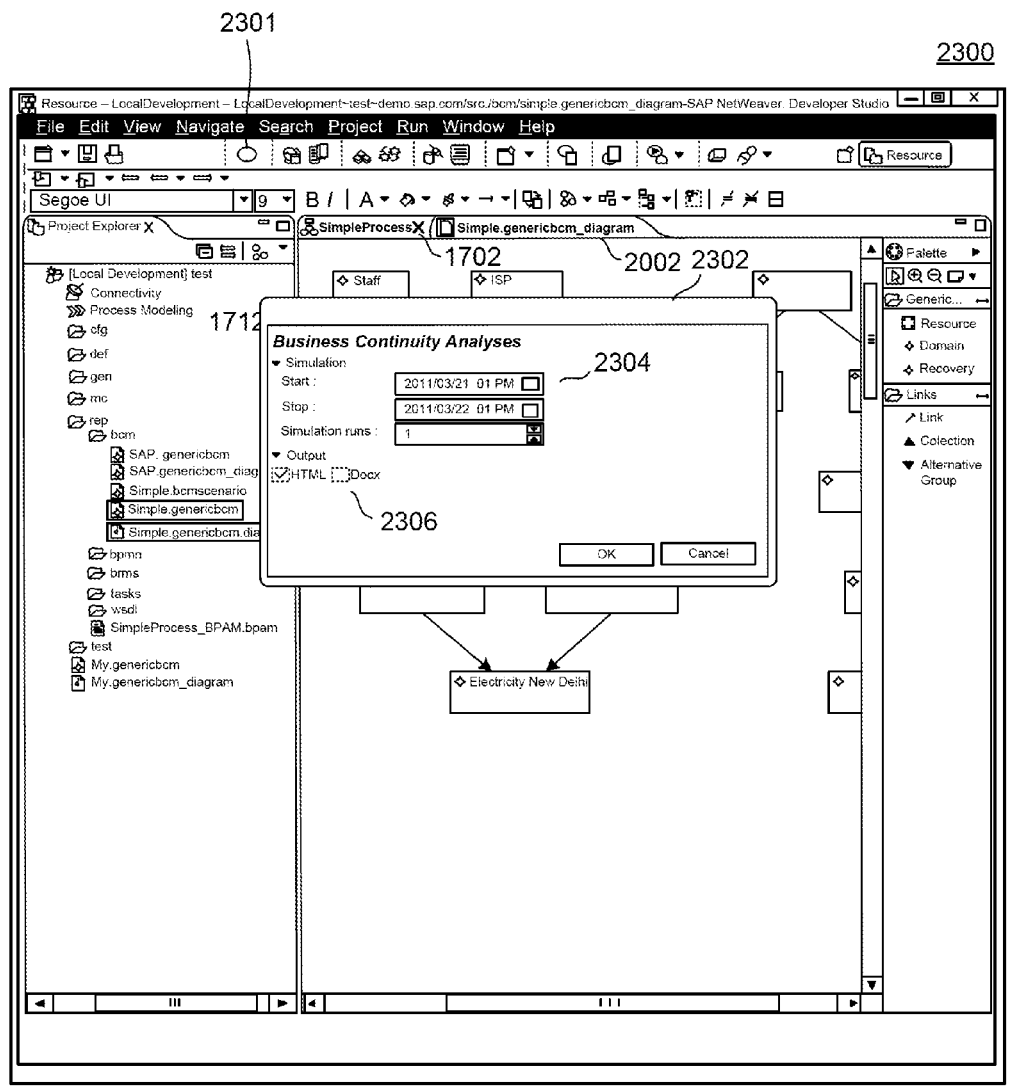

As shown with respect to the screenshot 2300 of FIG. 23, the BEAM of FIG. 22 may be used for performing business continuity analysis. For example, the business continuity analyst 310 may initiate such an analysis process by clicking a start analysis button 2301. Selection of the start analysis button 2301 launches the controller 1102 of FIG. 11, thereby allowing the business continuity analyst 310 to adjust analysis parameters. For example, as shown, a resulting pop-up window 2302 may enable the business continuity analyst 310 to adjust the simulation start/stop times and associated simulation runs shown in the portion 2304, while still controlling an output format using check boxes 2306.

Figure 24:
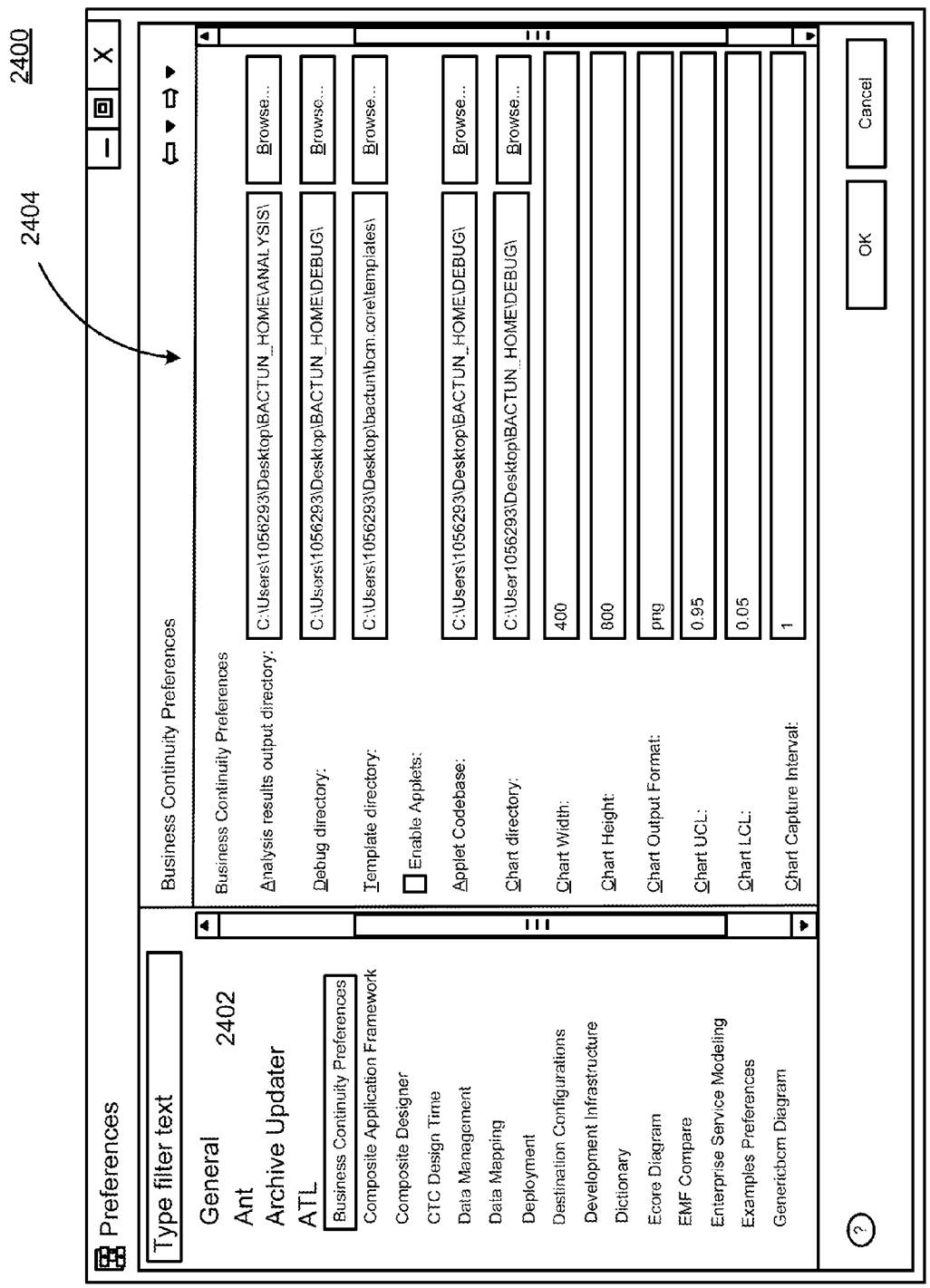

In a related interaction, the screenshot 2400 of FIG. 24 illustrates default parameter settings associated with the controller 1102 of FIG. 11. Specifically, as illustrated, parameters which may be changed on an infrequent basis (e.g., specified paths to corresponding template files) may be configured in the preference view of the screenshot 2400. As shown, a portion 2402 for selection among various such default parameter settings, including, as illustrated, selection of the business continuity preferences, which are then displayed for parameterization thereof within a portion 2404.

Figure 25:
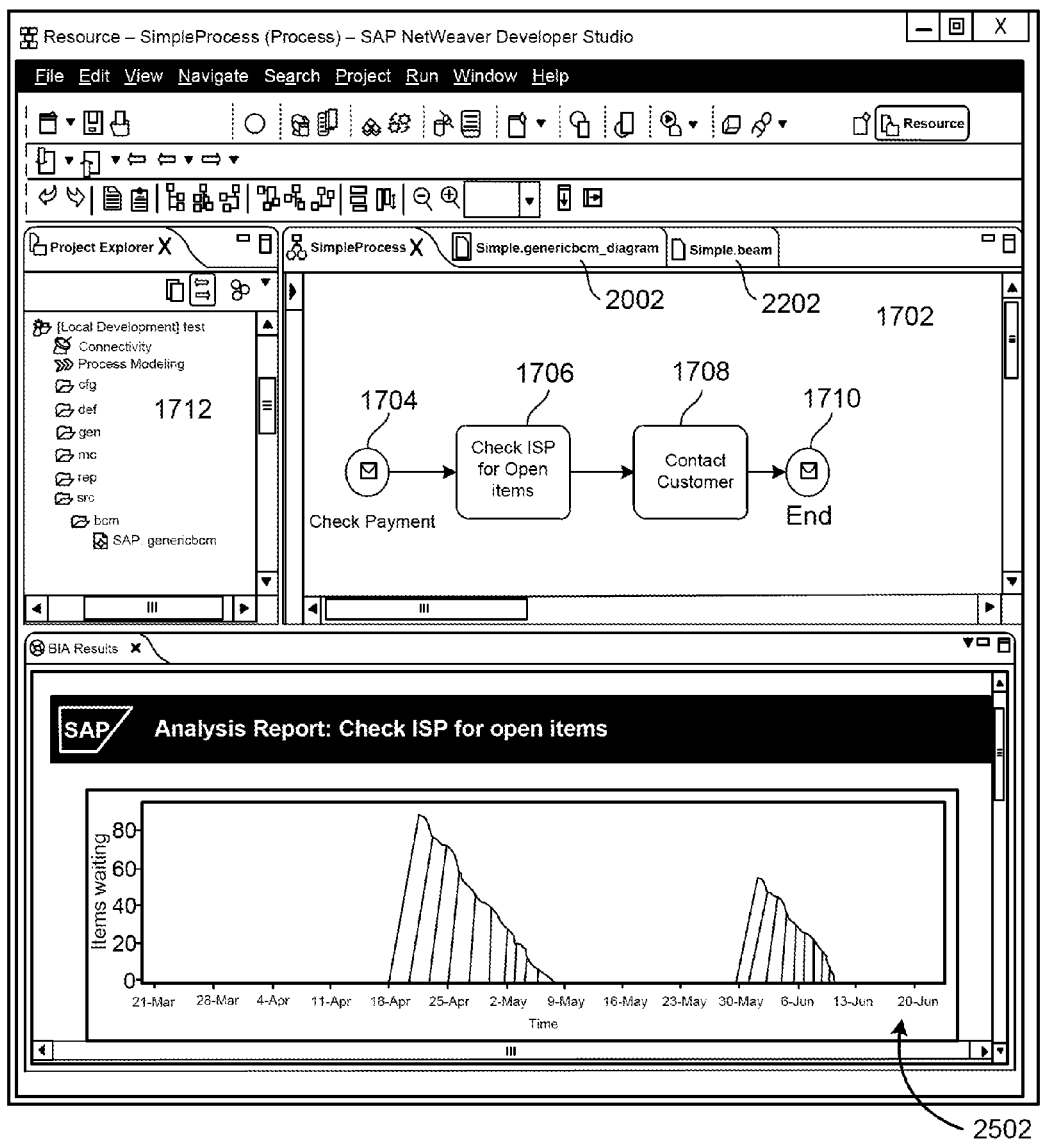

As illustrated in the example screenshot 2500 of FIG. 25, and as described in detail above, once the analysis run associated with FIG. 23 is completed, business continuity analyst results 2502 may be provided, e.g., to one or more of the various stakeholders, within their respective modeling environments. In the specific example of FIG. 25, the model environment of the business process expert 302 is illustrated. Specifically, in the example, it is illustrated that the business process expert 320 has selected the activity node 1704, so that the portion 2502 illustrates activities and analysis results for that particular process and activity in a visual format. As shown, the Impact Analysis (IA) results are illustrated, which may include, e.g., graphs, simulation results, etc. Of course, the business process expert 302 could similarly select the activity node 1706 to see analysis results for that activity, as shown in a corresponding portion 2602 of the screenshot 2600 of FIG. 26.

Figure 27:
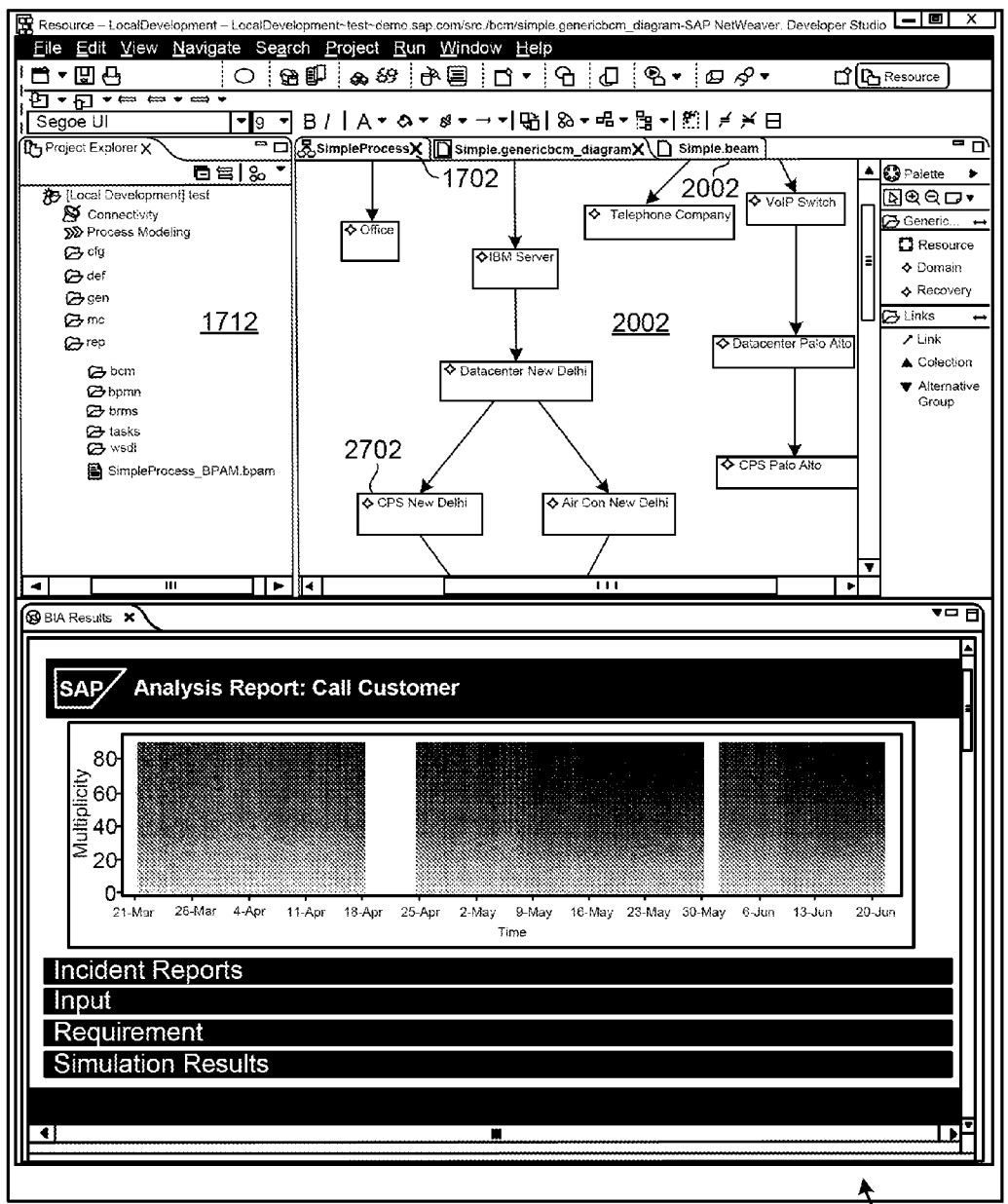

Similarly, context sensitive analysis results may be provided for the business continuity analyst 310 in an example screenshot 2700 of FIG. 27. For example, as shown, the business continuity analyst 310 may select the model element 2702, to thereby view analysis results associated therewith, in an interactive and visual manner.

Figure 26:
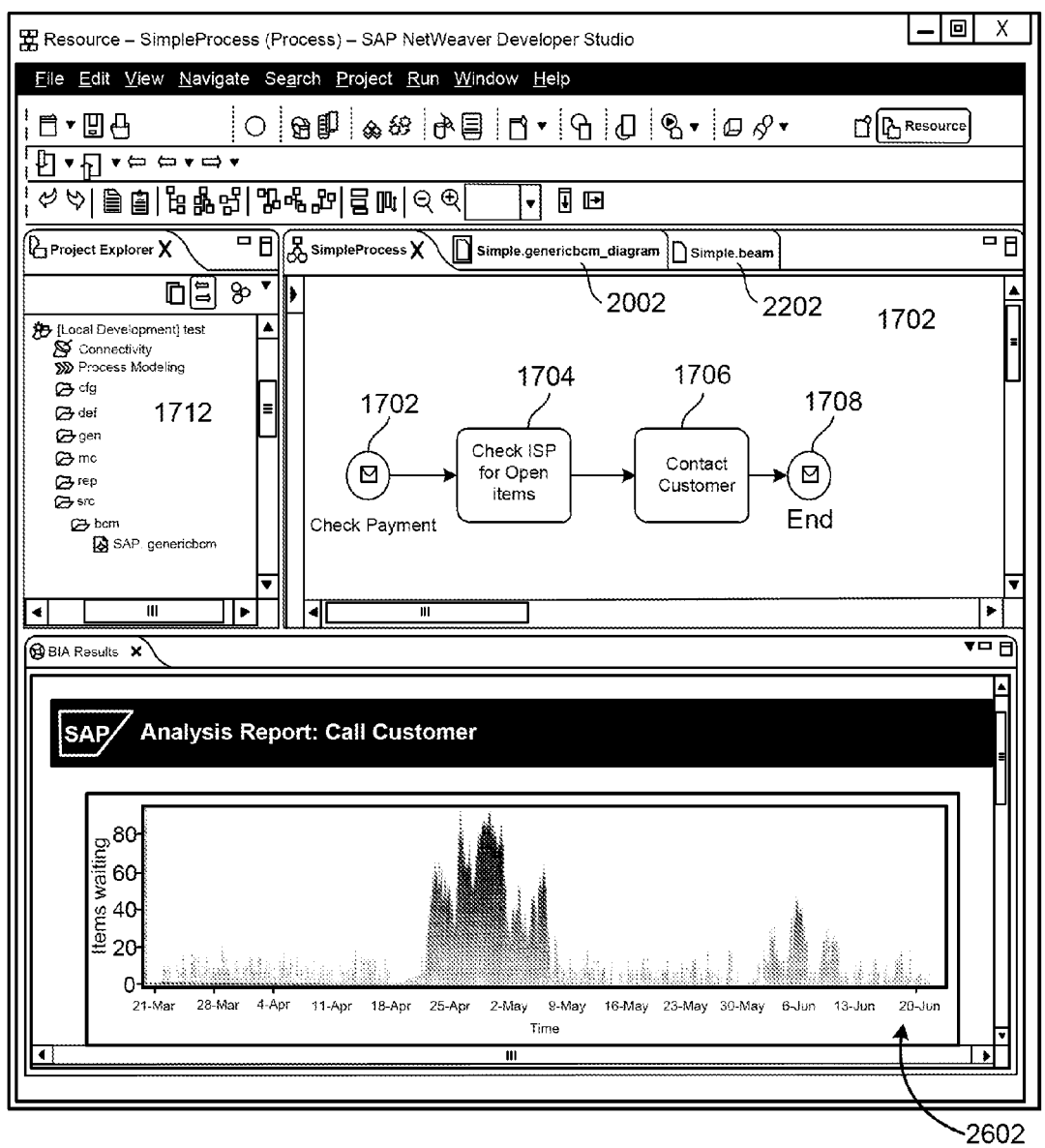

As referenced above, the business continuity analysis results may be provided in a variety of different formats. For example, the interactive, context sensitive views of FIGS. 25-27 illustrate example implementations relating to such analysis result views. However, as also described above, (e.g., with respect to FIGS. 3 and 16), the business continuity analysis results may be provided in a document-based format, as well.

Figure 28:
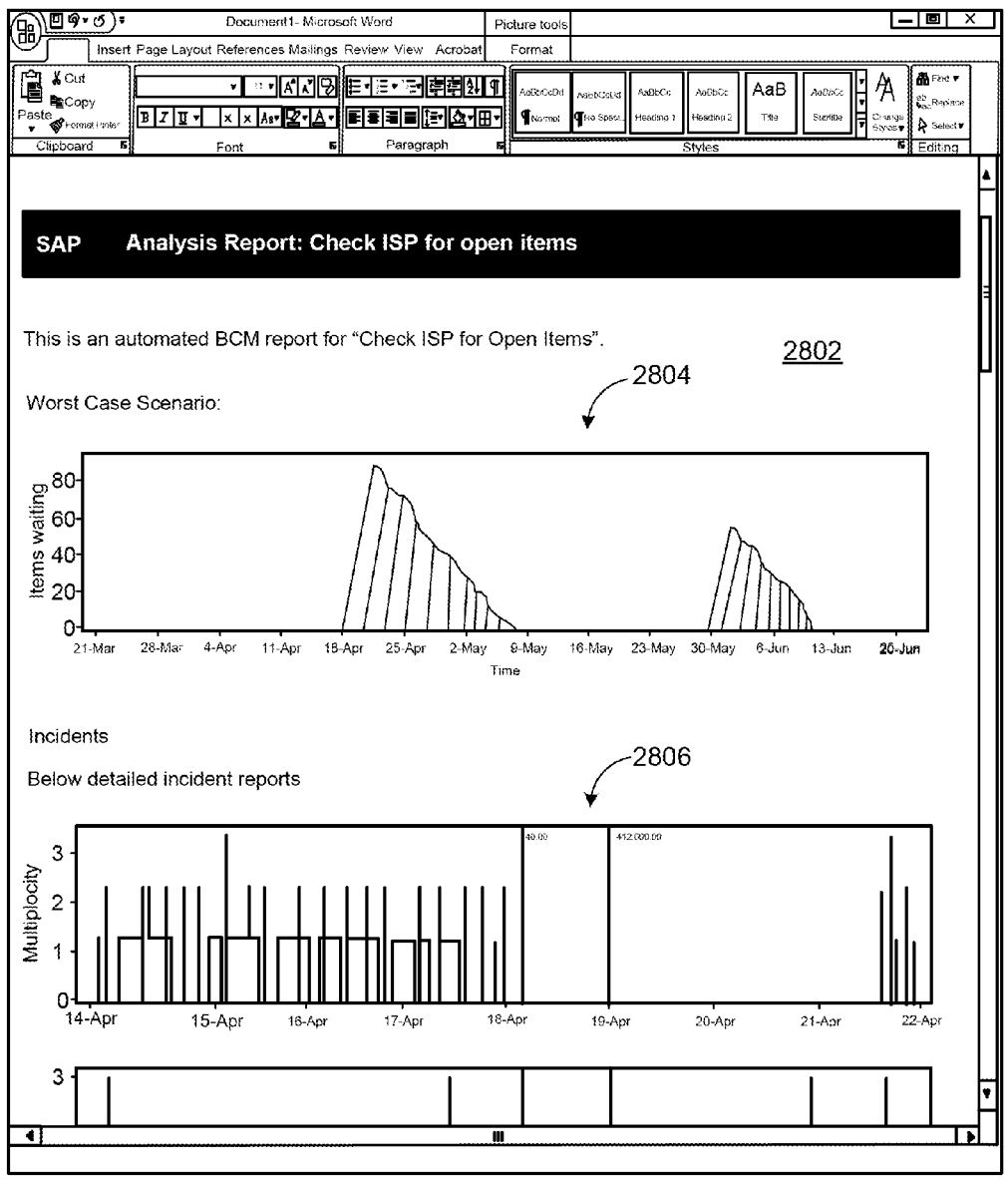

For example, in the screenshot 2800 of FIG. 28, such an analysis report for the business process model activity node 1704 ("check ISP for open items") is illustrated within view 2802. As shown, the generated report document may include a portion 2804 illustrating a worse case scenario, as well as a portion 2806 illustrating various incident reports.

Thus, it may be appreciated that FIGS. 1-28 describe and illustrate a business process centric framework for business continuity management, which utilizes already available business process models, IT landscape models, and other available models to automatically and efficiently uncover dependencies among the resources in different layers of an enterprise stack. As a result, many different stakeholders within the context of a business, or related to the business, may be provided with timely, up to date, detailed, and accurate information related to the construction and implementation of the business continuity plan. Consequently, associated businesses may be enabled to reduce risk exposure, avoid damage to their business reputation, avoid potential legal consequences, and otherwise increase profitability and/or enhance an efficiency and productivity of business operations.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor;
   a non-transitory computer-readable medium including instructions, when executed by the at least one processor, are configured to implement,
   a business process model (BPM) handler configured to cause the at least one processor to determine a business process model including tasks arranged according to a directed graph, at least some of the tasks associated with requirements for executing the tasks;
   an information technology topology model (ITTM) handler configured to cause the at least one processor to determine an information technology topology model with connected resources used to perform at least some of the tasks; and
   a model converter configured to cause the at least one processor to convert the business process model and the information technology topology model into a format compatible for input to a continuity analyzer, including,
      a behavior model generator configured to cause the at least one processor to determine behaviors of the resources from a behavior information library, and to generate a behavior model in which the tasks and their respective requirements are connected to the resources and to their respective behaviors, the behavior model having the format compatible for input to the continuity analyzer,
   wherein the continuity analyzer is configured to cause the at least one processor to provide a continuity analysis, based on the behavior model, the continuity analysis providing information related to potential risks, impacts, or recovery operations associated with predicted or potential business discontinuities.

2. The system of claim 1, wherein the BPM handler comprises an annotator configured to annotate each of the at least some of the tasks with the corresponding requirements, to thereby provide a business process annotated model (BPAM).

3. The system of claim 2, comprising a business process annotation view and graphical editor configured to display the BPM and to receive user selections of individual tasks of the BPM and associated user designations of the requirements and resources annotated thereto.

4. The system of claim 1, wherein the ITTM handler comprises a business continuity (BC) transformer configured to modify the ITTM to filter information therefrom which is not relevant to the connected resources.

5. The system of claim 4, comprising an IT BC graphical editor configured to display the ITTM and to receive user selections of the information to be filtered therefrom for removal thereof.

6. The system of claim 1, wherein the behavior information library includes a behavior mapping of at least one state to each resource, as well as associated conditions which trigger transitions between the states.

7. The system of claim 1, comprising a behavior model editor configured to provide a graphical view of the behavior model and to receive user modifications thereof.

8. The system of claim 1, wherein the behavior model generator is configured to construct a first behavior model based at least on the business process model, a second behavior model based at least on the IT topology model, and to construct the behavior model based on the first behavior model and the second behavior model.

9. The system of claim 1, further comprising a facilities model (FM) handler configured to cause the at least one processor to determine a facilities model in which model elements correspond to facility elements of a facility of the business, and wherein the behavior model generator is configured to generate the behavior model based on the facilities model.

10. The system of claim 1, wherein the continuity analyzer is configured to provide the continuity analysis including an interactive visualization of a simulation of operations associated with the business process model.

11. The system of claim 10, wherein the continuity analyzer is configured to provide the interactive visualization in a context sensitive manner based on a role of a requesting user.

12. The system of claim 11, comprising a graphical editor configured to display the BPM and to receive user selections of individual tasks of the BPM, wherein the continuity analyzer is configured to provide the context-sensitive visualization using the graphical editor and in response to a user selection of an individual task.

13. The system of claim 1, wherein the continuity analyzer is configured to provide the continuity analysis including generating a document which includes a static presentation of the continuity analysis.

14. The system of claim 1, wherein the behavior model is associated with at least one tracing model which links elements of the behavior model to source elements within the BPM and/or the ITTM.

15. A computer program product, the computer program product being tangibly embodied on a non-transitory computer-readable storage medium and comprising instructions that, when executed, are configured to:
  determine a business process model including tasks arranged according to a directed graph, at least some of the tasks associated with requirements for executing the tasks;
  determine an information technology topology model with connected resources used to perform at least some of the tasks;
  convert the business process model and the information technology topology model into a format compatible for input to a continuity analysis, including,
    determine behaviors of the resources from a behavior information library;
    generate a behavior model in which the tasks and their respective requirements are connected to the resources and to their respective behaviors, the behavior model having the format compatible for input to the continuity analysis; and
  provide the continuity analysis, based on the behavior model, the continuity analysis providing information related to potential risks, impacts, or recovery operations associated with predicted or potential business discontinuities.

16. The computer program product of claim 15, wherein a graphical editor is configured to display the BPM and to receive user selections of individual tasks of the BPM and associated user designations of the requirements and resources.

17. The computer program product of claim 15, comprising a graphical editor configured to display the BPM and to receive user selections of individual tasks of the BPM, wherein the continuity analysis is provided using the graphical editor and in response to a user selection of an individual task.

18. The computer program product of claim 15, wherein the continuity analysis includes an interactive visualization of a simulation of operations associated with the business process model.

19. A computer-implemented method comprising executing, using at least one processor, instructions recorded on a non-transitory computer-readable storage medium, the method comprising:
  determining, including the at least one processor, a business process model including tasks arranged according to a directed graph, at least some of the tasks associated with requirements for executing the tasks;
  determining, including the at least one processor, an information technology topology model with connected resources used to perform at least some of the tasks;
  converting, including the at least one processor, the business process model and the information technology topology model into a format compatible for input to a continuity analysis, including,
    determining behaviors of the resources from a behavior information library;
    generating a behavior model in which the tasks and their respective requirements are connected to the resources and to their respective behaviors, the behavior model having the format compatible for input to the continuity analysis; and
  providing the continuity analysis, based on the behavior model, the continuity analysis providing information related to potential risks, impacts, or recovery operations associated with predicted or potential business discontinuities.

20. The method of claim 19, wherein at least some of the tasks of the BPM are individually annotated with the corresponding requirements, to thereby provide a business process annotated model (BPAM).

* * * * *